(12) United States Patent
Okahara et al.

(10) Patent No.: US 6,889,365 B2
(45) Date of Patent: May 3, 2005

(54) TERMINAL OPERATION APPARATUS

(75) Inventors: Tohru Okahara, Osaka (JP); Ryuichi Matsukura, Kawasaki (JP); Kazuo Sasaki, Kawasaki (JP); Satoru Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 590 days.

(21) Appl. No.: 09/778,769

(22) Filed: Feb. 8, 2001

(65) Prior Publication Data

US 2001/0004254 A1 Jun. 21, 2001

Related U.S. Application Data

(63) Continuation of application No. PCT/JP99/00633, filed on Feb. 12, 1999.

(30) Foreign Application Priority Data

Aug. 10, 1998 (JP) ............................................. 10-226296

(51) Int. Cl.⁷ .............................................. G06F 15/00
(52) U.S. Cl. ........................ 715/858; 715/740; 715/755
(58) Field of Search ................................ 715/734–740, 715/727, 729, 751–759, 856, 857–858, 859–862, 863; 345/159, 179, 163, 740, 802, 748–749, 741–743, 856, 857, 858, 859–862, 711, 712, 828, 821–824, 796, 719–721, 754–755; 348/625, 630, 675; 708/313

(56) References Cited

U.S. PATENT DOCUMENTS

| | | | | |
|---|---|---|---|---|
| 5,570,028 A | * | 10/1996 | Sperlazzo et al. | 324/528 |
| 5,655,066 A | * | 8/1997 | Martin et al. | 345/858 |
| 5,691,747 A | * | 11/1997 | Amano | 345/856 |
| 5,748,189 A | * | 5/1998 | Trueblood | 715/755 |
| 5,771,036 A | * | 6/1998 | Martin et al. | 345/858 |
| 5,821,925 A | * | 10/1998 | Carey et al. | 345/852 |

(Continued)

FOREIGN PATENT DOCUMENTS

| | | |
|---|---|---|
| JP | 63-273125 | 11/1988 |
| JP | 2-171821 | 7/1990 |
| JP | 2-186782 | 7/1990 |
| JP | 3-175519 | 7/1991 |
| JP | 3-182926 | 8/1991 |

(Continued)

*Primary Examiner*—Steven Sax
(74) *Attorney, Agent, or Firm*—Staas & Halsey LLP

(57) ABSTRACT

The terminal operation apparatus of the present invention is used for an electronic conference and the like, in which an operated terminal having a shared screen is remotely operated through a network, the amount of information flowing through the network is adjusted, and continuity of an operation between the operated terminal and the operating terminal is kept, whereby operability is enhanced. Timers 72 and 73 or a point information detection counter 74 are used to transmit detailed point information with a decreased thinning ratio to the operated terminal for a predetermined period of time after the point information is inputted. A thinning ratio is set in accordance with a pointer movement speed and priorities (the order of connection, a CPU use ratio, whether or not an operation authority is obtained, etc.) among operators. Furthermore, an operation area of a operated terminal is provided, a pointer is displayed at a relative position on a shared screen, and a pointer is prevented from being unintentionally positioned off an area by setting a particular operation and the like for retreating from the operation area of the operated terminal. An inlet area and an outlet area are provided on a display screen of the operating terminal and a shared screen, respectively, whereby a pointer operation target is automatically switched to ensure continuity of a pointer operation.

30 Claims, 18 Drawing Sheets

U.S. PATENT DOCUMENTS

| | | | | |
|---|---|---|---|---|
| 5,828,372 A | * | 10/1998 | Kameda | 715/751 |
| 5,859,787 A | * | 1/1999 | Wang et al. | 708/315 |
| 5,864,678 A | * | 1/1999 | Riddle | 709/235 |
| 5,867,156 A | * | 2/1999 | Beard et al. | 715/753 |
| 6,018,570 A | * | 1/2000 | Matison | 379/207.15 |
| 6,038,516 A | * | 3/2000 | Alexander et al. | 702/67 |
| 6,049,334 A | * | 4/2000 | Bates et al. | 345/857 |
| 6,353,604 B2 | * | 3/2002 | Grimwood et al. | 370/335 |
| 6,608,636 B1 | * | 8/2003 | Roseman | 715/753 |
| 6,665,694 B1 | * | 12/2003 | Russell et al. | 708/313 |
| 6,754,295 B1 | * | 6/2004 | Hartnett | 375/356 |

FOREIGN PATENT DOCUMENTS

| | | |
|---|---|---|
| JP | 4-137122 | 5/1992 |
| JP | 6-314181 | 11/1994 |
| JP | 8-171533 | 7/1996 |
| JP | 8-179874 | 7/1996 |
| JP | 9-114628 | 5/1997 |
| JP | 9-146689 | 6/1997 |
| JP | 9-231044 | 9/1997 |
| JP | 9-244982 | 9/1997 |
| JP | 10-116168 | 5/1998 |

* cited by examiner

TERMINAL OPERATION APPARATUS

This application is a continuing application, filed under 35 U.S.C. §111(a), of International Application PCT/JP99/00633, filed Feb. 12, 1999, it being further noted that priority is based upon Japanese Patent Application 10-226296, filed Aug. 10, 1998.

1. Technical Field

The present invention relates to a terminal operation apparatus for connecting at least one operating terminal to at least one operated terminal via a network, and remotely operating the operated terminal from the operating terminal.

2. Background Art

In recent years, because of the development of a computer network system such as a local area network (hereinafter, abbreviated as a "LAN") and the Internet, computers are being used in various manners. One example thereof is an electronic conference system in which a terminal connected to a large projector or an electronic whiteboard is connected to terminals for conference attendants via a network, and conference attendants have a conference through a shared screen such as a large projector.

The electronic conference system is assumed to be used by connecting a plurality of remote terminals. Furthermore, in the conference, it is required to conduct operations such as displaying electronized materials on a projector and explaining the materials while pointing them out by using a pointing device such as a mouse. The electronic conference system has two challenges.

The first challenge is to enable a shared screen to be operated without letting an operator feel a physical distance and a time-lag between connecting terminals. It is expected that this challenge will be addressed by high-speed processing due to the advancement of a computer technique and a network technique.

The second challenge is to control operation authority. More specifically, in a system enabling a plurality of terminals to operate one shared screen, it becomes a critical issue how to control authority of operating (hereinafter, referred to as "operation authority") a terminal to be operated (hereinafter, referred to as an "operated terminal") from a terminal (hereinafter, referred to as an "operating terminal") of a conference attendant operating the shared screen. When it is made possible to operate an operated terminal from a plurality of operating terminals simultaneously or under the same kind of operation authority, confusion is caused in the case where a plurality of operation contents conflict with each other at the operated terminal, which prevents a smooth operation.

Conventional techniques regarding the control of operation authority of a terminal operation apparatus will be described below.

According to the first conventional system of controlling operation authority, irrespective of whether point information provided by a pointing device (e.g., a mouse) is obtained as operation information of its own operating terminal (hereinafter, referred to as an "operating terminal") or operation information of an operated terminal, the equivalent point information is transmitted to a target terminal so as to move a pointer. The first system will be referred to as an equivalent point system.

According to the second conventional system of controlling operation authority, an operation area for operating an operated terminal is provided on a display apparatus at an operating terminal. According to this operation area cutting-out system, an operation area having the same size as that of a display screen of an operated terminal or an operation area having a size of a part of a display screen of an operated terminal is cut out, whereby the operated terminal is allowed to be operated in the same way as in an operation of an operating terminal. Hereinafter, the second system will be referred to as an operation area cutting-out system.

According to the third conventional system of controlling operation authority, it is switched whether an operation screen to be displayed in a display apparatus at an operating terminal is used as an operation screen of an operating terminal or as an operation screen of an operated terminal. For switching, an icon of a switching button (hereinafter, referred to as a "remote operation cancel button") is provided on a display apparatus at an operating terminal, so that conference attendants operating a shared screen press the remote operation cancel button when they finish an operation on the shared screen and release operation authority. Hereinafter, the third system will be referred to as a button switching system.

The systems of controlling operation authority with respect to a shared screen in an electronic conference system described in the above-mentioned prior art have the following problems, respectively.

The equivalent point system that is the first conventional system of controlling operation authority has a problem that adjustment of point information to be transmitted to an operated terminal lacks in flexibility. More specifically, point information is transmitted to an operated terminal via a network such as a LAN, so that the point information is likely to be influenced by the traffic amount of other information flowing on the network. Furthermore, in the case where point information is transmitted from a plurality of operating terminals to one operating terminal, as the number of operating terminals on an input side is increased, more burden will be applied to processing at an operated terminal, and it is becoming impossible for a pointer at the operated terminal to keep up with an input speed of an operator on an input side.

Because of the above-mentioned problems, according to the conventional equivalent point system, it is required to limit the number of operating terminals on an input side of electronic conference attendants. Furthermore, it takes a while for a pointer to actually start moving by an operation of a person who gains operation authority with respect to a shared screen, and thereafter, the movement of the pointer becomes awkward, which makes this system unsuitable for use at a human's reaction speed.

On the other hand, when point information is simply decreased, in the case where it is required to move a pointer minutely, it becomes difficult to locate a pointer at a position intended by an operator in proportion to the decrease in information.

According to the operation area cutting-out system that is the second conventional system of controlling operation authority, an operation area obtained by cutting out a display screen of an operated terminal is provided on a display apparatus of an operating terminal. Usually, the display screen of the operated terminal has the same resolution as that of the operating terminal, so that a large operation area is required for operating more regions on the display screen of the operated terminal. Therefore, there is a problem that an operation of the operating terminal itself is influenced. Furthermore, in the case where a part of the display screen of the operated terminal is cut out so as to prescribe the operation area to be small, it is impossible to conduct an operation over the entire display screen of the operated terminal.

Because of the above-mentioned problems, according to the operation area cutting-out system, electronic conference attendants are required to operate not only an operated terminal but also an operating terminal during a conference. Therefore, the operability of an operating terminal or an operated terminal is decreased depending upon the setting of a cut out operation area. For example, in the case where a cut out operation area is small, an electronic conference attendant is likely to operate a pointer while watching a shared screen without watching a display screen of an operating terminal on hand. Therefore, the pointer may be unintentionally positioned off the operation area.

According to the button switching system that is the third conventional system of controlling operation authority, the entire display screen is switched when an operation target is switched. Therefore, an operation is discontinued, and a continuous operation such as movement of a file from an operating terminal to an operated terminal cannot be conducted as a series of continuous operations. Therefore, processing of switching operation authority is required between a series of operations, which causes discontinuation of an operation. For example, when an operator desires to explain using materials in a file at an operating terminal, the operator first transfers the file from an operating terminal to an operated terminal, gains operation authority of the operated terminal by pressing a switching button, and opens a transmitted file on a shared screen, which is more complicated in an operation procedure, compared with an operation of opening a file in a usual desktop environment.

Furthermore, the conventional button switching system has other problems. In general, in the case where attendants have an electronic conference while watching a shared screen such as a large projector, it is convenient that they can directly operate an operated terminal while watching a large projector that is a display screen of the operated terminal without watching a display screen of an operating terminal. However, according to the button switching system, it is required to watch the operating terminal for canceling operation authority and gaining operation authority, which often interrupts discussion of the attendants.

DISCLOSURE OF INVENTION

In view of the above-mentioned problems of the conventional terminal operation apparatus, one object of the terminal operation apparatus of the present invention is to adjust the amount of information flowing between an operating terminal and an operated terminal and enhance a response of a pointer at the operated terminal with respect to input from a pointing device at the operating terminal.

Another object of the terminal operation apparatus of the present invention is to allow an operated terminal to be operated in the same way as in an operating terminal without degrading the operability of a single operating terminal, even in the case of providing an operation area. Still another object is to prevent a pointer from being unintentionally positioned off an operation area on a display screen of an operating terminal while operating an operated terminal.

Still another object of the terminal operation apparatus of the present invention is to render a shift of an operation from an operating terminal to an operated terminal continuous, so as to provide a user with an intuitive operation.

In order to achieve the above-mentioned object, in the terminal operation apparatus of the present invention, an operating terminal includes an input part provided with a pointing device and a sampling rate adjusting part for altering a sampling rate of point information inputted from the input part, and an amount of the point information transmitted to a network is adjusted by adjusting a sampling rate of the point information from the input part.

Because of the above-mentioned constitution, traffic on the network and the amount of the point information processed by the operated terminal can be adjusted, and a pointer can be smoothly moved on a shared screen of the operated terminal.

Next, it is preferable that the operating terminal includes a first timer for storing a first set time and a second timer for storing a second set time, the first timer counts an elapsed time from commencement of input of point information from the input part, the second timer counts an elapsed time from termination of input of point information from the input part, the sampling rate adjusting part adjusts the sampling rate as a first sampling rate within the first set time and adjusts the sampling rate as a second sampling rate after an elapse of the first set time, and the first timer is reset by an elapse of the second set time.

Because of the above-mentioned constitution, an operator can adopt a high sampling rate as a first sampling rate until a predetermined time will elapse from commencement of an operation of an input part such as a pointing device (i.e., at the beginning of an operation of a pointer) and realize a minute movement of the pointer by increasing the amount of point information to be transmitted, and reduces a sampling rate after an elapse of a predetermined time (i.e., at the end of a grace period at which an operator's intended operation can be conducted) to adjust the amount of information flowing through the network.

Next, it is preferable that the operating terminal includes a pointer movement speed detecting part for detecting a movement speed of a pointer from point information inputted from the input part, the sampling rate adjusting part adjusts the sampling rate as a first sampling rate if the detected pointer movement speed is equal to or lower than a set speed and adjusts the sampling rate as a second sampling rate if the pointer movement speed is higher than the set speed.

Because of the above-mentioned constitution, when an operator is moving a pointer slowly and minutely, a high sampling rate is adopted as a first sampling rate and the amount of point information to be transmitted is increased to render the movement of the pointer minute, and when the pointer is moved at a set speed or higher (i.e., roughly), a sampling rate is decreased to reduce the amount of information, whereby the amount of information flowing through the network can be adjusted.

Next, it is preferable that the operated terminal includes a CPU use ratio detecting part for detecting a CPU use ratio, the sampling rate adjusting part adjusts the sampling rate as a first sampling rate if the detected CPU use ratio is equal to or smaller than a predetermined level and adjusts the sampling rate as a second sampling rate if the detected CPU use ratio is larger than the predetermined level.

Because of the above-mentioned constitution, in the case where a CPU use ratio of the operated terminal is high and the load on the operated terminal side is large, a sampling rate of point information transmitted from each operating terminal can be prescribed to be a low sampling rate as a second sampling rate, whereby the amount of point information can be adjusted in accordance with a load state of the operated terminal, and a smooth operation of an electronic conference system can be conducted.

Next, it is preferable that the operated terminal includes a display part to be the shared screen and sets a particular region on the shared screen of the display part, and the sampling rate adjusting part of the operating terminal alters and adjusts a sampling rate in accordance with a distance between a pointer displayed on the shared screen and the particular region.

Because of the above-mentioned constitution, in the case where a pointer comes close to a particular region such as an icon and a task bar for operation, a sampling rate can be kept high, and a minute operation can be easily conducted, and in the case where a pointer is not present in the vicinity of these particular regions, a sampling rate can be lowered as a rough pointing operation, and a smooth operation of an electronic conference system can be conducted.

Next, it is preferable that the operated terminal includes a priority setting part for setting priorities among the operating terminals, and the sampling rate adjusting part of the operating terminal alters a sampling rate of point information in accordance with the set priority.

Because of the above-mentioned constitution, in the case where there are a plurality of operating terminals, a line capacity is preferentially assigned to operating terminals with high priority such as those of a conference facilitator, and a main speaker, whereby efficient data communication can be conducted as an entire network system, and a smooth operation of an electronic conference system can be conducted.

Next, it is preferable that the priority setting part sets priorities among the operating terminals in accordance with an order of connection to the operated terminal.

Because of the above-mentioned constitution, a line capacity can be assigned in accordance with predetermined priorities such as an order of connection among the operating terminals, and a smooth electronic conference system can be conducted.

Next, it is preferable that the operated terminal includes an operation authority setting part for setting an operation authority for preferentially conducting an operation of the operated terminal with respect to the operating terminal, and the priority setting part sets higher priority with respect to a person holding an operation authority given by the operation authority setting part.

Because of the above-mentioned constitution, a line capacity can be preferentially assigned to a person having an operation authority as a speaker in accordance with the process situation of a conference, and a smooth electronic conference system can be conducted.

Furthermore, in order to solve the above-mentioned problem, in the terminal operation apparatus of the present invention, the operated terminal includes a display part to be a shared screen, the operating terminal includes an input part provided with a pointing device and a display part provided with a shared screen reduction displaying processing part for displaying an operated terminal operation area in which the shared screen of the operated terminal is displayed in a reduced size, in a case where a pointer of the pointing device is outside of the operated terminal operation area, operation information by the pointing device is taken in as operation information with respect to the operating terminal, in a case where the pointer of the pointing device is in the operated terminal operation area, operation information by the pointing device is transmitted to the operated terminal to remotely operate the operated terminal, and a relative position of the pointer in the operated terminal operation area is equal to a relative position of a pointer on the shared screen of the operated terminal.

Because of the above-mentioned constitution, even in the case where an operated terminal operation area is set appropriately small for keeping an operation region for local operation of a single operating terminal, the entire shared screen of the operated terminal can be operated, and the operability of the single operating terminal will not be degraded.

Next, it is preferable that, with respect to a movement operation of the pointer by the pointing device of the operating terminal, a movement speed of the pointer on the display screen of the operating terminal is altered depending upon whether or not the pointer is in the operated terminal operation area.

Because of the above-mentioned constitution, even for the same movement operation of the pointer with respect to the pointing device, in the case where the pointer is in the operated terminal operation area, a movement speed of the pointer on the display screen of the operating terminal can be decreased, and even when an operation is conducted using the entire shared screen of the operated terminal, a pointer moving in synchronization on the display screen of the operating terminal will not be unintentionally positioned off the operated terminal operation area.

Next, it is preferable that the operating terminal includes a pointer retreat restriction part for restricting retreat of the pointer from the operated terminal operation area, and in a case of detecting a previously set event, the pointer retreat restriction part permits retreat of the pointer from the operated terminal operation area.

Because of the above-mentioned constitution, while the pointer on the shared screen of the operated terminal is operated, the pointer on the display screen of the operating terminal will not be unintentionally positioned off the operated terminal operation area. Examples of events that can be set include a movement while a button of the pointing device is being pressed, and a movement at a predetermined speed or higher.

Furthermore, in order to solve the above-mentioned problem, in the terminal operation apparatus of the present invention, the operating terminal includes an input part provided with a pointing device and a display part provided with an operated terminal inlet area, the operated terminal includes a display part to be a shared screen, the shared screen includes an operated terminal outlet area, the inlet area and the outlet area are particular regions for generating an event for switching an operation target of the pointing device, in a case where a pointer enters the inlet area on the display screen of the operating terminal, operation information by the pointing device is transmitted to the operated terminal to execute a remote operation of a pointer on the shared screen of the operated terminal, in a case where the pointer enters the outlet area on the shared screen of the operated terminal, the remote operation of the operated terminal is canceled, and operation information by the pointing device is taken in as operation information with respect to the operating terminal.

Because of the above-mentioned constitution, an operation of the operating terminal and an operation of the operated terminal are automatically switched through the inlet area and the outlet area, whereby a flow of an operation across both the terminals is made continuous.

Next, it is preferable that the operating terminal and the operated terminal manage a file by relating it to a particular file identifier, when the file identifier is moved to the inlet area on the display screen of the operating terminal, the file is transmitted to the operated terminal, and a file identifier corresponding to the file is displayed on the shared screen of the operated terminal.

Because of the above-mentioned constitution, the operating terminal and the operated terminal have a virtual path using the inlet area and the outlet area as gates, and an operator can conduct continuous operations of transfer of data, a file identifier, and a point identifier between both the terminals through the virtual path.

Next, it is preferable that a ratio of the inlet area occupying the display screen of the operating terminal and a ratio of the outlet area occupying the shared screen of the operated terminal can be adjusted.

Because of the above-mentioned constitution, a relative size of the inlet area and the outlet area on the operation screen can be adjusted, easiness of entering the inlet area and retreating from the outlet area can be adjusted, and a smooth operation of an electronic conference system can be ensured.

Furthermore, in order to solve the above-mentioned problem, in the terminal operation apparatus of the present invention, the operating terminal includes an input part provided with a pointing device, the operated terminal includes a display part to be a shared screen and an operation authority setting part for setting an operation authority for preferentially conducting an operation of the operated terminal with respect to the operating terminal, and cancellation of the set operation authority can be conducted by a particular operation of a pointer on the shared screen of the operated terminal.

Because of the above-mentioned constitution, for canceling an operation authority, a pointer operation on the display screen of the operating terminal can be made unnecessary, and an operation authority can be canceled without taking eyes off the shared screen. Furthermore, a pointer on the display screen of the operating terminal is unnecessary from the commencement of holding an operation authority to cancellation thereof, so that the pointer is not required to be displayed or can be left, which prevents generation of an unintentional event on the operating terminal.

Next, it is preferable that the shared screen of the operated terminal includes an operation authority cancellation button region, and the operation authority is canceled by a pressing operation of the operation authority cancellation button region by the pointer on the shared screen.

Because of the above-mentioned constitution, for canceling an operation authority, a pointer operation on the display screen of the operating terminal is made unnecessary, and an operation authority can be canceled by pressing the operation cancellation button on the shared screen.

Next, it is preferable that the operated terminal includes a timer for storing a grace period until an operation authority is forcefully canceled, the timer counts an elapsed time after an input operation from the pointing device of the operating terminal holding an operation authority is terminated, and cancels the operation authority if the grace period has elapsed.

Because of the above-mentioned constitution, an operation authority can be canceled by terminating an input operation for a predetermined period of time, based on the intention of a person holding an operation authority.

Next, it is preferable that the operating terminal includes a camera and a gesture analyzing part for analyzing human's gesture, and the gesture analyzing part analyzes input for instructing cancellation by operator's gesture and notifies the operated terminal of cancellation of the operation authority, thereby canceling the operation authority.

Because of the above-mentioned constitution, for canceling an operation authority, a pointer operation on the display screen of the operating terminal can be made unnecessary, and an operation authority can be canceled by operator's gesture, e.g., an operation such as drawing a cross by a hand.

Next, it is preferable that the operating terminal includes a voice input apparatus and a voice analyzing part for analyzing human's voice input, input for instructing cancellation by operator's voice from the voice input apparatus is analyzed by the voice analyzing part, and the operation authority can be canceled by notifying the operated terminal of cancellation of the operation authority.

Because of the above-mentioned constitution, for canceling an operation authority, a pointer operation on the display screen of the operating terminal can be made unnecessary, and an operation authority can be cancelled by a voice instruction by an operator, for example, voice input such as "cancellation".

Next, a computer-readable recording medium stores a processing program for realizing the terminal operation apparatus of the present invention, the program including a point information input processing operation of receiving input of point information at the operating terminal and a sampling rate alteration processing operation of altering a sampling rate of the input point information, wherein the sampling rate of the input point information is adjusted, whereby an amount of the point information transmitted to the network is adjusted.

Because of the above-mentioned processing program, the terminal operation apparatus capable of adjusting traffic on the network and the amount of point information to be processed at the operated terminal can be realized by using a computer.

Next, a computer-readable recording medium stores a processing program for realizing the terminal operation apparatus of the present invention, the program including: a point information input processing operation of receiving input of point information at the operating terminal; a processing operation of providing a display screen having an operated terminal operation area as a display screen of the operating terminal; a processing operation of providing a shared screen of the operated terminal; a processing operation of, in a case where a pointer based on the input point information is outside of the operated terminal operation area, using the point information as operation information with respect to the operating terminal; a processing operation of, in a case where the pointer based on the input point information is in the operated terminal operation area, transmitting the point information to the operated terminal to remotely operate the operated terminal; and a processing operation of displaying in such a manner that a relative position of the pointer in the operated terminal operation area is equal to a relative position of the pointer in the shared screen of the operated terminal.

Because of the above-mentioned processing program, even in the case where the operated terminal operation area can be set appropriately small for keeping an operation region for a local operation of a single operating terminal, the terminal operation apparatus, in which the entire shared screen of the operated terminal can be operated and the operability of a single operating terminal will not be degraded, can be realized by using a computer.

Next, a computer-readable recording medium stores a processing program for realizing the terminal operation apparatus of the present invention, the program including: a point information input processing operation of receiving input of point information at the operating terminal; a processing operation of providing a display screen having an operated terminal inlet area as a display screen of the operating terminal; a processing operation of providing a shared screen of the operated terminal having an operated terminal outlet area; a processing operation of, in a case where a pointer enters the inlet area on the display screen of the operating terminal, transmitting operation information by the pointing device to the operated terminal to execute a remote operation of a pointer on the shared screen of the operated terminal; and a processing operation of, in a case where the pointer enters the outlet area on the shared screen of the operated terminal, canceling the remote operation of the operated terminal and taking in the operation information by the pointing device as operation information with respect to the operating terminal.

Because of the above-mentioned processing program, the terminal operation apparatus, in which an operation of the operating terminal and an operation of the operated terminal are automatically switched through the inlet area and the outlet area, whereby a flow of an operation across both the terminals is made continuous, can be realized by using a computer.

Next, a computer-readable recording medium stores a processing program for realizing the terminal operation apparatus of the present invention, the program including: a point information input processing operation of receiving input of point information at the operating terminal; a processing operation of providing a shared screen of the operated terminal; a processing operation of setting an operation authority for preferentially conducting an operation of the operated terminal with respect to the operating terminal; and a processing operation of canceling the set operation authority by a particular operation of a pointer on the shared screen of the operated terminal.

Because of the above-mentioned processing program, for canceling an operation authority, a pointer operation on the display screen of the operating terminal can be made unnecessary, and an operation authority can be canceled without taking eyes off the shared screen.

BEST MODE FOR CARRYING OUT THE INVENTION

Hereinafter, a terminal operation apparatus of embodiments according to the present invention will be described with reference to the drawings.

Embodiment 1

A terminal operation apparatus of Embodiment 1 has a function of adjusting a sampling rate of the amount of point information inputted from a pointing device at an operating terminal by an electronic conference attendant having operation authority, thereby appropriately regulating the amount of point information transmitted to an operated terminal.

The outline of the entire structure of the terminal operation apparatus and the entire image of a processing flow of the apparatus in Embodiment 1 will be described with reference to the drawings.

Figure 1:
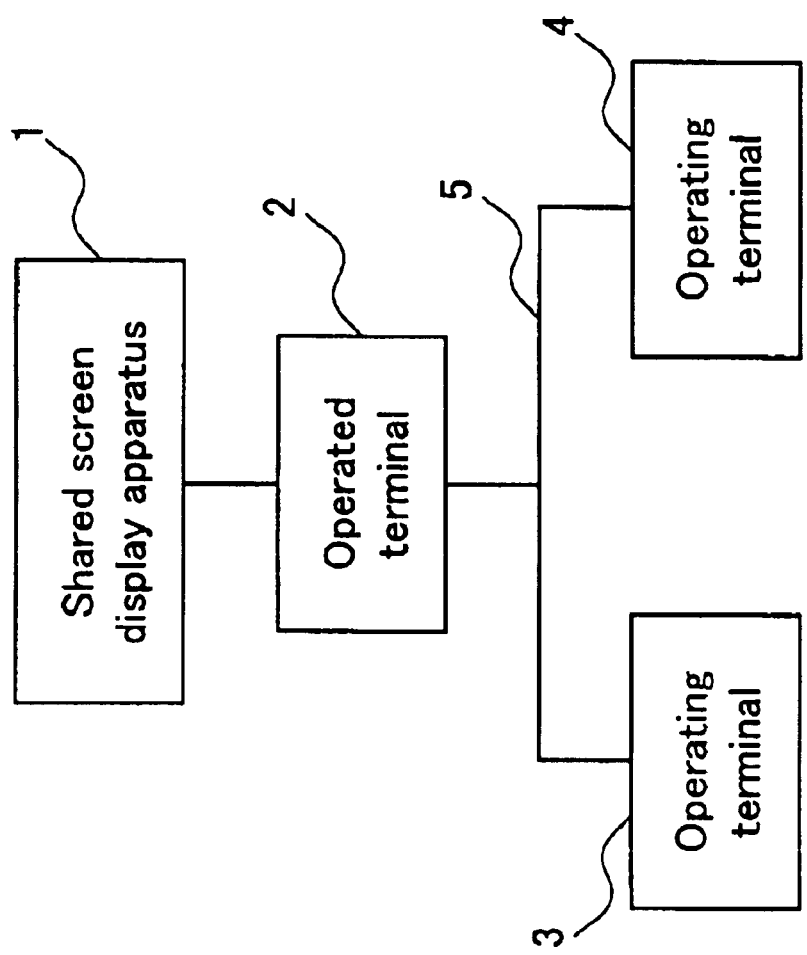
FIG. 1 is a schematic block diagram showing the entire network realizing a terminal operation apparatus of Embodiment 1 according to the present invention.

FIG. 1 shows a schematic structure of the entire network realizing the terminal operation apparatus. In FIG. 1, reference numeral 1 denotes a shared screen display apparatus such as a large projector for displaying a shared screen shared by electronic conference attendants, 2 denotes an operated terminal that directly controls the shared screen display apparatus 1, and 3 and 4 denote operating terminals used by each electronic conference attendant.

The operated terminal 2 and the operating terminals 3 and 4 are connected via a network 5. The operating terminals 3 and 4 gain operation authority of the operated terminal 2 on the shared screen by a method described later, and can control the operated terminal 2 by using point information from an accessory pointing device.

In FIG. 1, although two operating terminals 3 and 4 are shown, the number of the operating terminals may be increased/decreased depending upon the number of conference attendants.

Furthermore, the shared screen display apparatus 1 is not limited to a projector. It is appreciated that the shared screen display apparatus 1 may be a cathode-ray tube display apparatus, a liquid crystal display apparatus, or the like.

Figure 2:
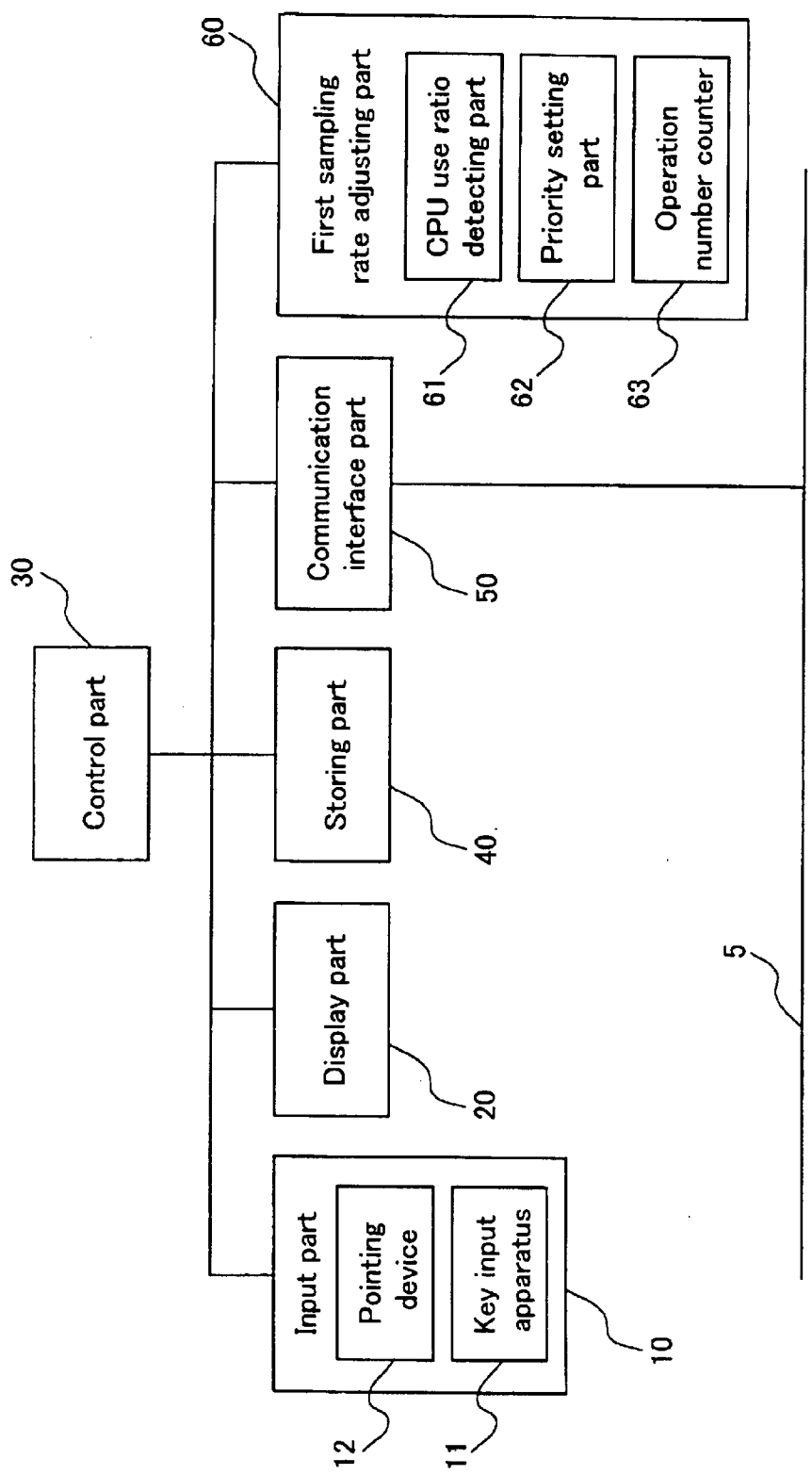
FIG. 2 is a block diagram showing a schematic structure of an operated terminal in Embodiment 1 according to the present invention.
Figure 3:
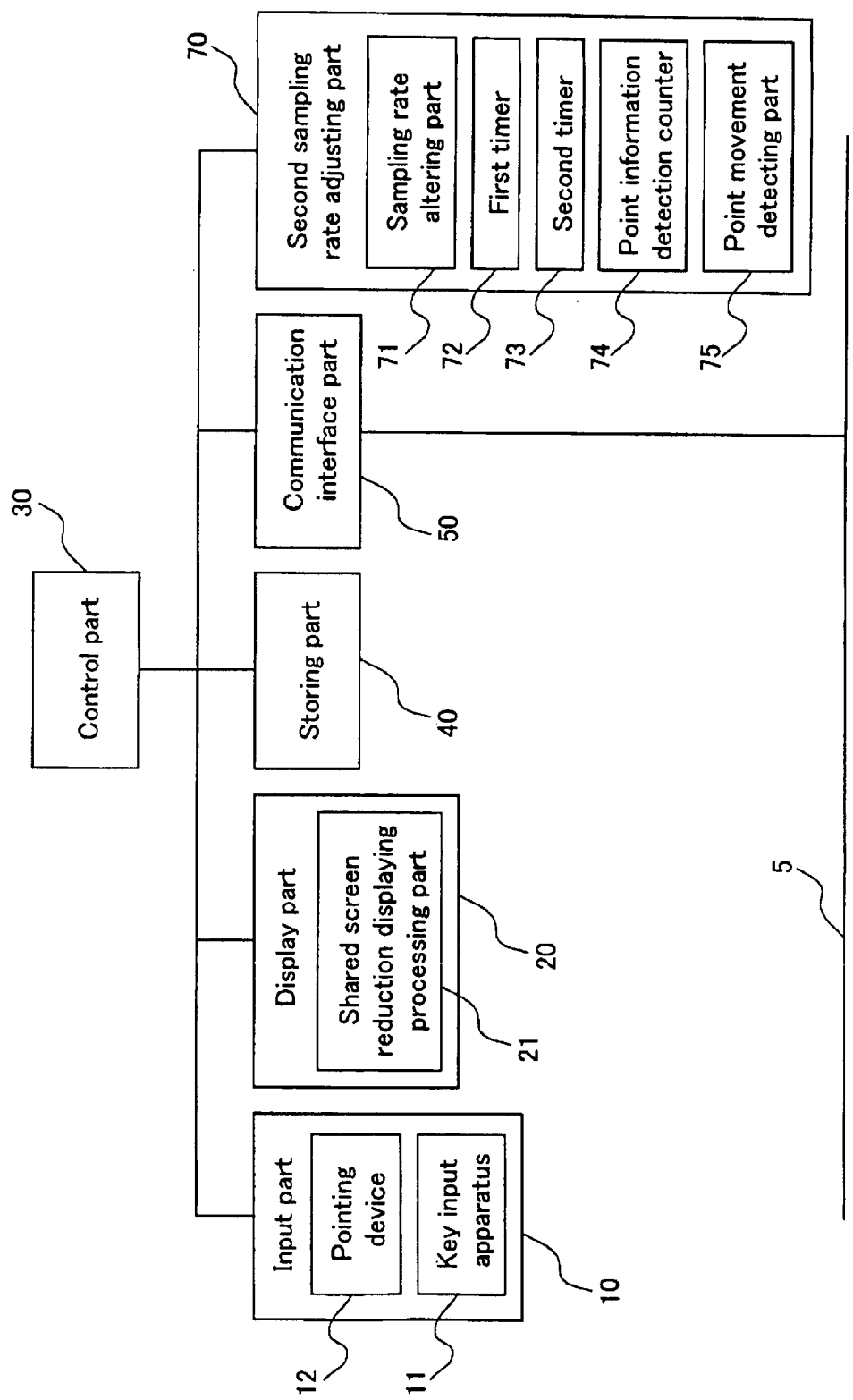
FIG. 3 is a block diagram showing a schematic structure of an operating terminal in Embodiment 1 according to the present invention.

FIGS. 2 and 3 are block diagrams each showing a schematic structure of an information processing apparatus utilized as a terminal apparatus constituting the terminal operation apparatus of the present invention. FIG. 2 is a block diagram of an operated terminal, and FIG. 3 is a block diagram of an operating terminal. In FIGS. 2 and 3, like reference numerals denote like components.

As shown in FIG. 2, the operated terminal of Embodiment 1 roughly includes an input part 10, a display part 20, a control part 30, a storing part 40, a communication interface part 50, and a first sampling rate adjusting part 60. Although not shown, it is assumed that the operated terminal is provided with devices required for controlling the entire system.

Furthermore, as shown in FIG. 3, the operating terminal of Embodiment 1 roughly includes an input part 10, a display part 20, a control part 30, a storing part 40, a communication interface part 50, and a second sampling rate adjusting part 70. Although not shown, it is assumed that the operating terminal is provided with devices required for controlling the entire system.

The input part 10 is used for inputting operation information from a user, and is provided with a key input apparatus 11 such as a keyboard and a pointing device 12 such as a mouse. As the key input apparatus 11, a key code input apparatus such as a hand-written letter recognition apparatus, as well as a keyboard can be used. Furthermore, as the pointing device 12, a pointing device such as a tablet and an electronic pen, as well as a mouse can be used.

The display part 20 may be any display apparatus, as long as it is used as a display apparatus of a computer such as a color cathode-ray tube apparatus, a liquid crystal display apparatus, a plasma display, a projector, and an electronic whiteboard. In Embodiment 1, a large projector is used. Furthermore, as shown in FIG. 3, the display part 20 on the operating terminal side is provided with a shared screen reduction displaying processing part 21. The shared screen reduction displaying processing part 21 displays an operation area of the operated terminal, in which a shared screen of the operated terminal 2 is displayed in a reduced size on a display screen of the display part 20 of the operating terminal. By displaying a shared screen of the operated terminal in a reduced size in the display part 20 of the operating terminal, as described later in Embodiment 2, etc., a user of the operating terminal can use both an operation area of the operated terminal and a local operation area of the operating terminal in a part of a user's screen, and the entire shared screen can be displayed in a reduced size in the operation area of the operated terminal.

The control part 30 is a microprocessor unit or the like, which is used for controlling each part of the apparatus. The control part 30 also functions as a part for performing various judgements, such as an operation authority setting part for setting operation authority with respect to the operating terminal.

The storing part 40 is a storing medium such as a memory and a hard disk, which may be volatile or non-volatile. The storing part 40 stores a program and data required for controlling the apparatus, and accessed by the control part 30. Data used in the terminal operation apparatus of Embodiment 1 includes the following three kinds of data.

Firstly, there is information on determining a processing target, for processing information inputted from the input part 10 through the control part 30 and the communication interface part 50 of the operating terminal and determining whether the input information is processing information with respect to the operating terminal or processing information with respect to the operated terminal 2 on the network.

Secondly, there is a sampling rate of a pointer and sampling rate information for adjusting a sampling rate.

Thirdly, there is area information regarding various areas provided on a GUI screen generated on the display part 20.

The communication interface part 50 controls data communication between the respective terminal apparatuses constituting the terminal operation apparatus, and is provided with required hardware and driver software.

The first sampling rate adjusting part 60 of the operated terminal in Embodiment 1 is provided with a CPU use ratio detecting part 61, a priority setting part 62, and an operation number counter 63. The CPU use ratio detecting part 61 detects a use ratio of a CPU in the control part 30 of the operated terminal, and sets priorities for operating the operated terminal among the operating terminals connected to the priority setting part 62. The operation number counter 63 counts the number of transmissions of point information from each operating terminal.

The second sampling rate adjusting part 70 of the operating terminal in Embodiment 1 is provided with a sampling rate altering part 71, a first timer 72, a second timer 73, a point information detection counter 74, and a pointer movement detecting part 75. The sampling rate altering part 71 alters a sampling rate of point information from the input part 10, the point information detection counter 74 counts the amount of input point information, and the pointer movement detecting part detects a movement speed of a pointer.

A function of adjusting the amount of point information in the terminal operation apparatus of Embodiment 1 will be described.

As described in the introduction, the terminal operation apparatus of Embodiment 1 has a function of appropriately adjusting the amount of point information (which is inputted from the pointing device of the operating terminal by an electronic conference attendant having operation authority) transmitted to the operated terminal. In Embodiment 1, the amount of point information is adjusted by regulating a sampling rate of the pointing device 12, such as a mouse, of the input part 10.

Figure 4:
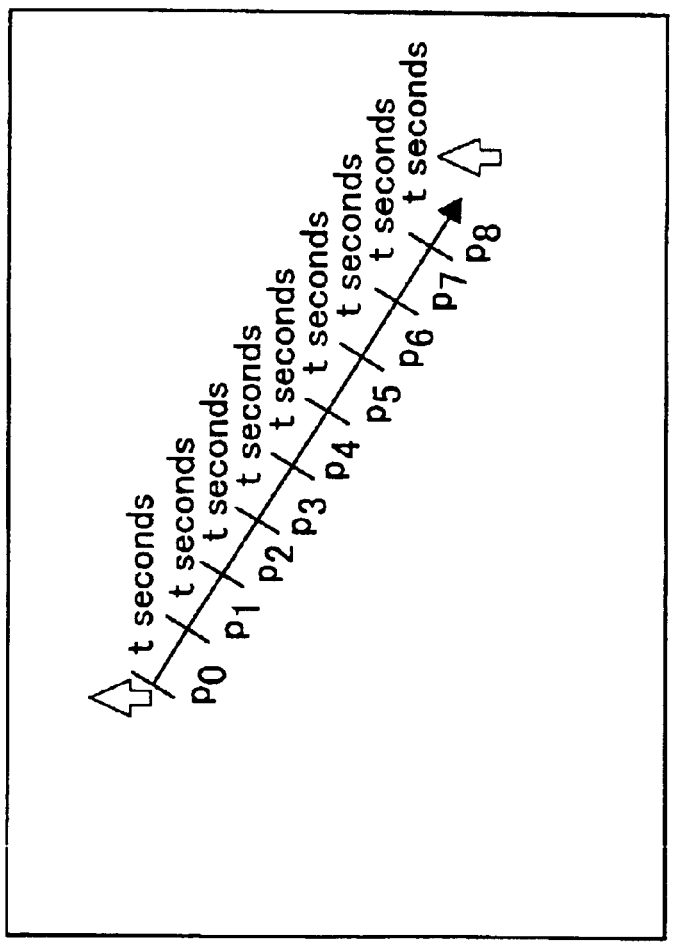
FIG. 4 is a diagram illustrates a concept of a sampling rate used by the terminal operation apparatus of Embodiment 1 according to the present invention.

First, a sampling rate will be described. FIG. 4 illustrates a concept of a sampling rate. Herein, sampling refers to extracting a coordinate position of a mouse at a predetermined time interval. A driver of the pointing device 12 controlled by the control part 30 samples a coordinate position inputted by a mouse at an interval of t seconds when an operator moves a mouse and obtains point coordinates of the mouse. FIG. 4 shows the movement of a mouse pointer on a display. In this case, the mouse pointer moves from a point A to a point B, during which it takes 8*t seconds; therefore, 8 samplings are conducted, and 8 point coordinates (p0 to p7) in total are successively obtained.

Figure 5:
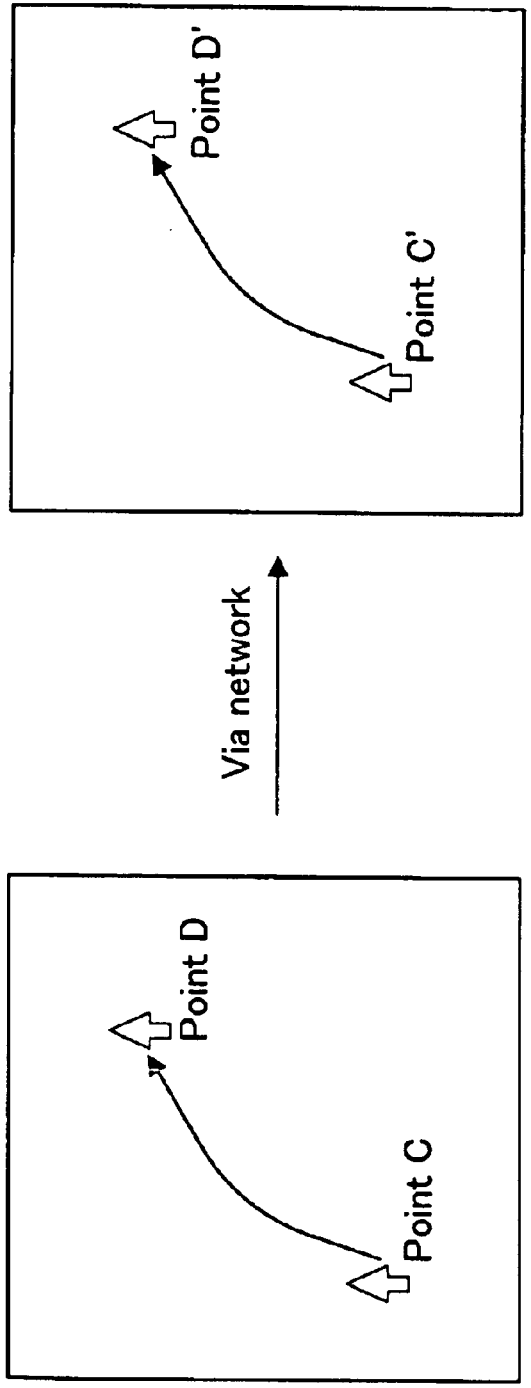
FIG. 5 is a diagram showing a state of a synchronous movement of a pointer on a display screen of an operating terminal and a pointer on a shared screen of an operated terminal in Embodiment 1 according to the present invention.

FIG. 5 shows a state of a synchronous movement of a mouse pointer on a display screen of the display part 20 of the operating terminal 3 and a mouse pointer on a display screen of the display part 20 of the operated terminal 2. When an operator of the operating terminal 3 operates the pointing device 12 to move a pointer from a point C to a point D as shown on a display screen of the operating terminal on the left side of FIG. 5, the operating terminal 3 samples point coordinate data in accordance with a predetermined sampling rate, and transmits it to the operated terminal 2 via the network 5. The operated terminal 2 receives the transmitted point coordinate data, and moves a pointer from a point C' to a point D' as shown on a display screen of the operated terminal on the right side of FIG. 5, in accordance with the received data. Because of this, the pointer on the operated terminal side can be operated in synchronization with the operation of the pointing device 12 on the operating terminal side.

For describing a state of a synchronous movement, FIG. 5 shows the respective pointers on the display screens of the operating terminal and the operated terminal. However, while the pointer of the operated terminal 2 is being operated, the pointer is not necessarily displayed on the display screen of the operating terminal 3.

The concept of the synchronous operation of the pointer operation and the sampling has been described above. Next, a system of regulating the amount of point information transmitted on the network will be described.

In Embodiment 1, the point information transmitted at any time from the operating terminal is thinned, whereby the amount of point information to be transmitted is appropriately limited. Furthermore, thinning processing is devised, whereby a smooth operation of the pointer on the operated terminal side is realized. In Embodiment 1, as thinning processing of point information, the following three thinning processings will be described.

In the first thinning processing, a thinning ratio is prescribed to be small at the beginning of movement of a pointing device, and a thinning ratio of point information is increased after a predetermined time has elapsed or after the pointing device has moved by a predetermined amount. Because of processing of adjusting a thinning ratio by using a difference in time or in movement amount, the pointer of the operated terminal can be moved minutely at the beginning of the operation of the pointing device, and its operability can be enhanced.

As an example of a system of realizing the first thinning processing, a system using a timer and a system using a point information detection counter will be described.

The system using a timer will be described now. Herein, two timers: a first timer and a second timer are used. The first timer is used for detecting the passage of a predetermined time by the time when the thinning ratio is increased. The second timer is used for detecting the passage of a predetermined time after the termination of the point information input, and is used for determining whether the point information input is temporarily terminated during a series of mouse operations or the point information input is terminated due to the completion of a series of mouse operations.

The system using a timer utilizes the following four kinds of data. They are a first timer 72 (which comes to time-out at a predetermined time X) starting at the beginning of the movement of a mouse, a second timer 73 (which comes to time-out at a predetermined time Y) starting after point information stops being detected, a first point information thinning ratio m ($0 \leq m < 1$), and a second point information thinning ratio n ($0 \leq m < n < 1$). Herein, the second point thinning ratio n is set to be larger than the first point thinning ratio m. The respective data is stored in the storing part 40, and if required, used as data of the control part 30 and the sampling rate altering part 71.

Processing operations of the system using a timer of the first thinning processing will be described with reference to the flow chart in FIG. 6.

First, an operator starts an operation by using the pointing device 12 such as a mouse. The control part 30 monitors input from the pointing device 12 through a driver, and detects the commencement of the operation of the pointing device 12 (Operation S601).

When detecting the commencement of the operation of the pointing device 12, the control part 30 resets the first timer 72 and allows it to start counting. Furthermore, the control part 30 sets a thinning ratio at m by the sampling rate altering part 71 (Operation S602). More specifically, the thinning ratio is set to be small immediately after the commencement of the operation of the pointing device 12.

Point information (point coordinate data) is detected from the pointing device 12 in accordance with a predetermined sampling rate (Operation S603).

Next, it is checked if the first timer 72 has come to time-out (Operation S604). More specifically, it is checked if the predetermined time X has elapsed after the commencement of input. In the case where the predetermined time X has not elapsed, the thinning ratio is maintained at m, and the process proceeds to Operation S605. When the predetermined time X has elapsed, the thinning ratio is changed to n (Operation S608). Because of these processing operations, the processing of the present invention can be realized, in which a small thinning ratio is applied within a predetermined time after the commencement of input by the pointing device, and a high thinning ratio is applied after the passage of a predetermined time.

Then, the second timer 73 is checked in Operation S605. In the case where the second timer 73 has not come to time-out, the process proceeds to Operation S606. In the case where the second timer 73 has come to time-out, the process returns to Operation S601. This means that the previous series of operations are completed after the passage of a predetermined time Y, and processing of a new series of operations will start.

In Operation S606, the control part 30 resets the second timer 73 and allows the second timer 73 to start counting. The reason for this is that after point information is detected at Operation S603, a time elapsed by the time when the point information is detected at the subsequent Operation 603 in a loop is counted. Because of this, it is possible to know an elapsed time after no input is detected from the pointing device 12.

Next, at Operation 607, the point information obtained at Operation S603 is thinned at a currently specified thinning ratio, and data after thinning is transmitted to the operated terminal 2.

The system using a timer for realizing the first thinning processing has been described above.

Next, the system using the point information detection counter 74 will be described. According to the system using the point information detection counter 74, the following four kinds of data are used. They are a point information detection counter 74 (A counter value is assumed to be c. Herein, $0 \leq c < C$, C is a constant), a second timer 73 (which comes to time-out at Y) starting after point information stops being detected, a first point information thinning ratio m ($0 \leq m < 1$), and a second point information thinning ratio n ($0 \leq m < n \leq 1$). In the same way as in the timer system, the second point thinning ratio n is set larger than the first point thinning ratio m. The respective data is stored in the storing part 40, and if required, used as data of the control part 30 and the sampling rate altering part 71.

Figure 7:
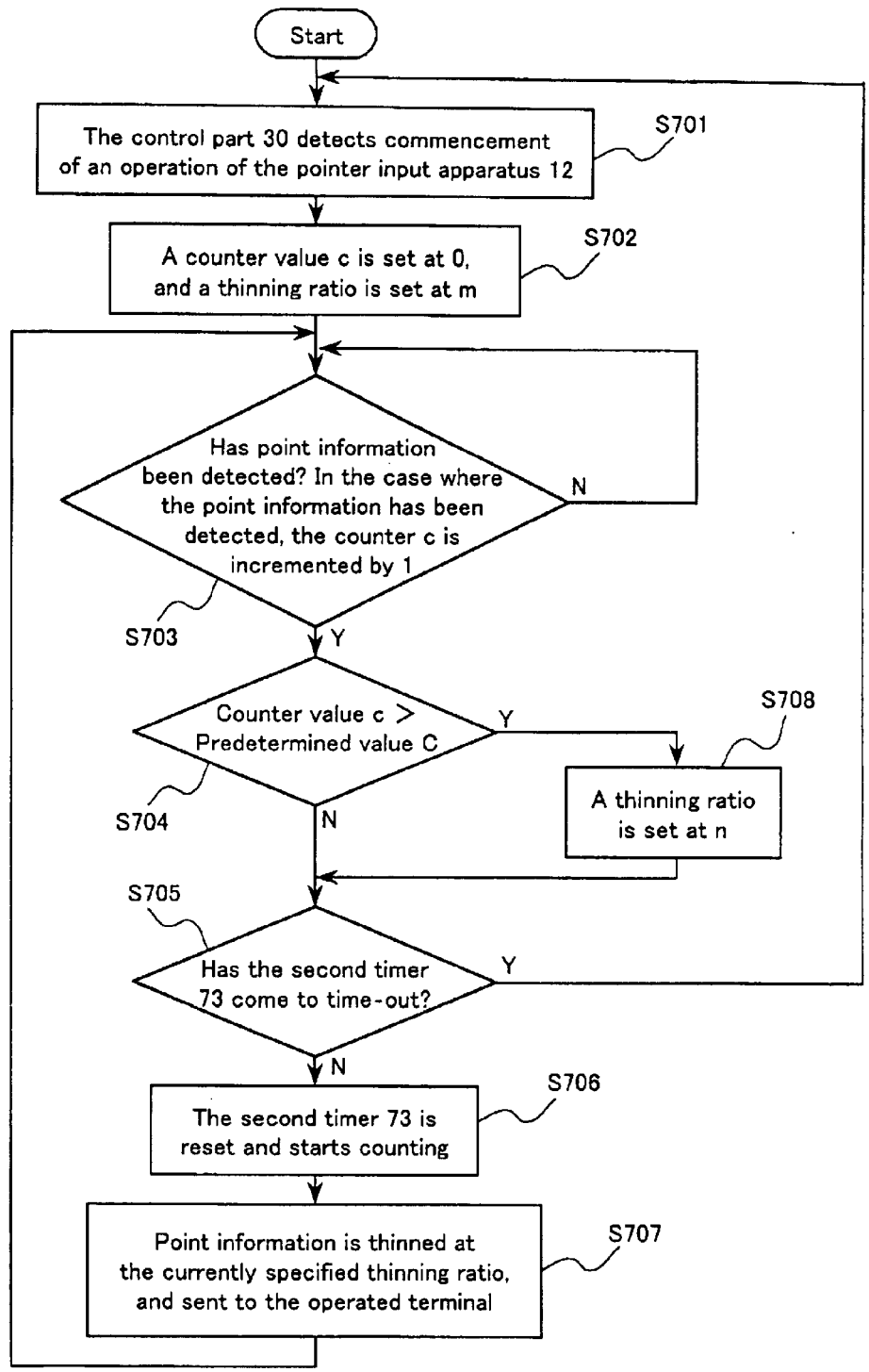
FIG. 7 is a flow chart showing processing operations of first thinning processing using a point information detection counter in Embodiment 1 according to the present invention.

Processing operations of the system using the point information detection counter 74 of the first thinning processing will be described with reference to the flow chart in FIG. 7.

First, an operator starts an operation by using the pointing device 12 such as a mouse. The control part 30 monitors input from the pointing device 12 through a driver, and detects the commencement of the operation of the pointing device 12 (Operation S701).

When detecting the commencement of the operation of the pointing device 12, the control part 30 resets the point information counter 74 and allows it to start counting. Furthermore, the control part 30 sets a thinning ratio at m by the sampling rate altering part 71 (Operation S702). More specifically, the thinning ratio is set to be small immediately after the commencement of the operation of the pointing device 12.

Point information (point coordinate data) is detected from the pointing device 12 in accordance with a predetermined sampling rate. The point information counter 74 increments the counter value c by "1" on the basis of the detection of a point coordinate (Operation S703).

Next, it is checked if the count value c of the point information counter 74 has reached C (Operation S704). More specifically, it is checked if the amount of point information detected after input is started has reached a predetermined amount C. In the case where the amount of point information has not reached a predetermined amount C, the thinning ratio is maintained at m, and the process proceeds to Operation S705. When the amount of point information has reached a predetermined amount C, the thinning ratio is changed to n (Operation S708). Because of these processing operations, the processing of the present invention can be realized, in which a small thinning ratio is applied at the beginning of input by the pointing device to allow the movement of the pointer to be minute, and a high thinning ratio is applied thereafter.

Figure 6:
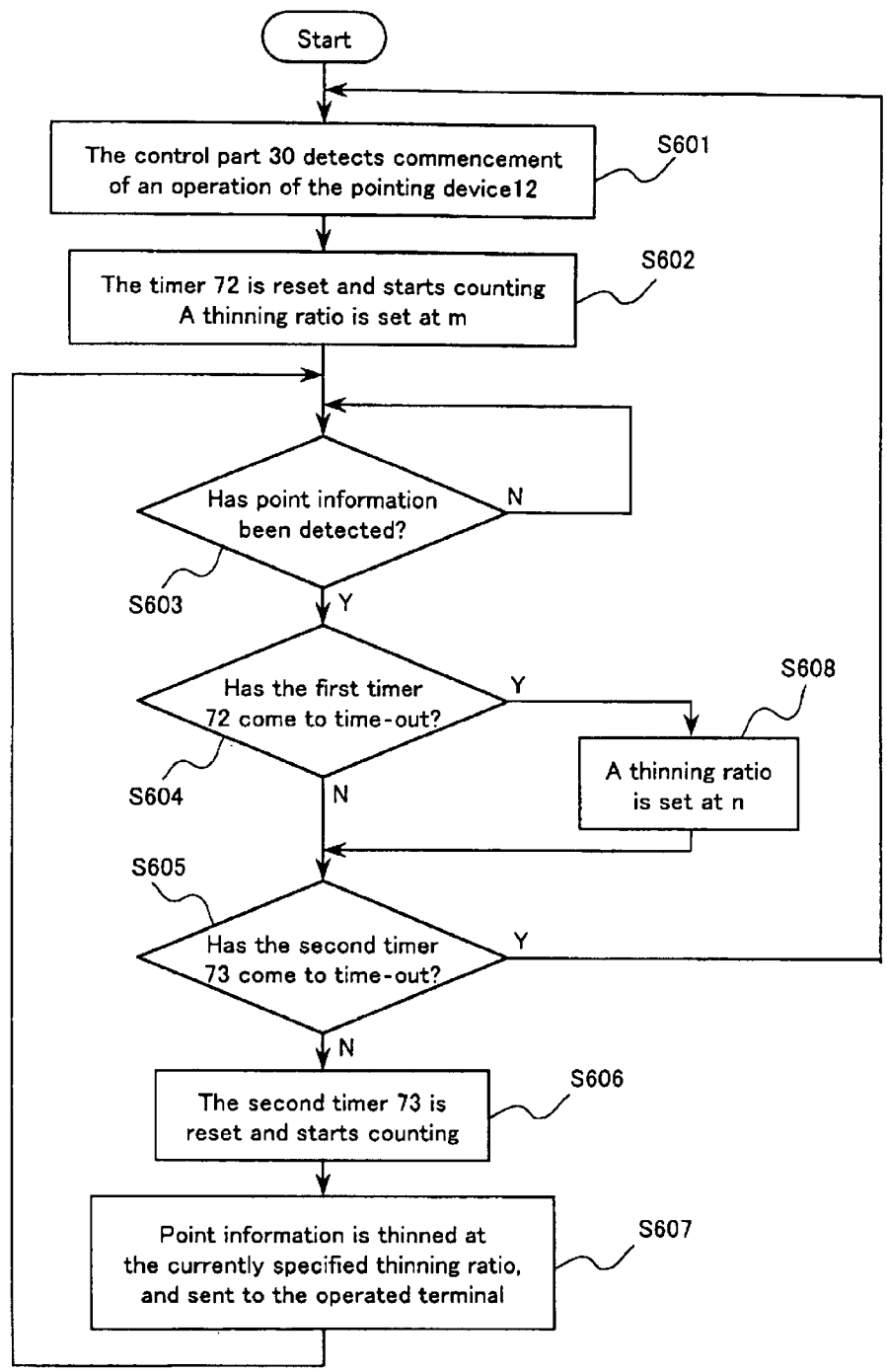
FIG. 6 is a flow chart showing processing operations of first thinning processing using a timer in Embodiment 1 according to the present invention.

Next, the processing operations after Operation 705 using the second timer 73, regarding the detection of an elapsed time after no input is detected from the pointing device 12 and its processing are the same as those after Operation S606 in the flow chart in FIG. 6 described in the timer system. Therefore, the description thereof will be omitted here.

The system using the point information detection counter 74 for realizing the first thinning processing has been described above.

Thus, according to the first thinning processing of the terminal operation apparatus of Embodiment 1, a thinning ratio is prescribed to be small when the pointing device starts being moved, and a thinning ratio of point information can be adjusted to be large after a predetermined time has elapsed or the pointing device has been moved by a predetermined amount. Because of the processing of adjusting a thinning ratio by using the difference in time or movement amount, a line capacity can be economized without degrading operability, and a pointer can be operated smoothly on the operated terminal side.

Next, the second thinning processing of the terminal operation apparatus of Embodiment 1 will be described.

According to the second thinning processing, a thinning ratio is adjusted in accordance with a movement speed of a pointer by the pointing device. In the case where the movement speed of the pointer is small, it is determined that the pointer is moving minutely, and a thinning ratio of point information is set to be small. In contrast, in the case where the movement speed of the pointer is large, it is determined that the pointer is moving roughly, and a thinning ratio of the pointer is set to be large.

An exemplary system of adjusting a thinning ratio in accordance with the movement speed of a pointer, which is the second thinning processing, will be described below.

According to the system of adjusting a thinning ratio in accordance with the movement speed of a pointer, the following four kinds of data are used. They are a pointer coordinate p immediately before scanning, a first point information thinning ratio m ($0 \leq m < 1$), a second point information thinning ratio n ($0 \leq m < n \leq 1$), and a threshold value V of of a speed for switching a thinning ratio. Herein, the second point thinning ratio n is set to be larger than the first point thinning ratio n. The respective data is stored in the storing part 40, and if required, used as data of the control part 30 and the sampling rate altering part 71.

Figure 8:
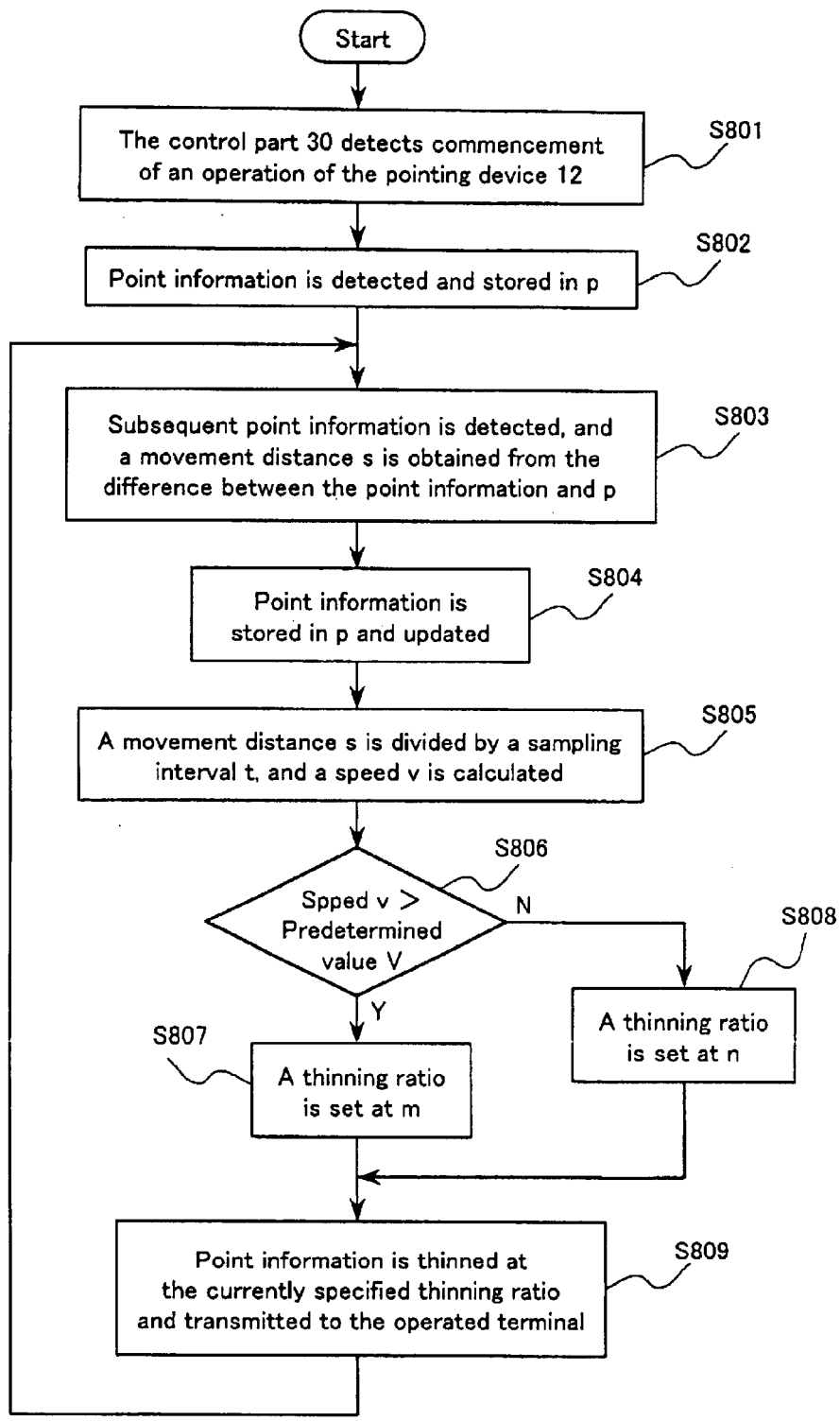
FIG. 8 is a flow chart showing processing operations of second thinning processing in Embodiment 1 according to the present invention.

The processing operations of the second thinning processing system will be described with reference to a flow chart in FIG. 8.

First, an operator starts an operation using the pointing device 12 such as a mouse. The control part 30 monitors input from the pointing device 12 through a driver, and detects the commencement of the operation of the pointing device 12 (Operation S801).

When detecting the commencement of the operation of the pointing device 12, the pointer movement detecting part 75 detects point information (coordinate), and stores it as p (Operation S802).

Then, sampled point information (coordinate) is detected, and a movement distance s is obtained based on the difference between the sampled point information and p (Operation S803). Furthermore, data of p is updated based on the sampled point information (coordinate) (Operation S804).

The point movement detecting part 75 divides the movement distance s by a sampling interval t (seconds) to calculate a movement speed v (Operation S805). It is investigated if the calculated movement speed v is larger than the set movement speed threshold value V (Operation S806). A thinning ratio is determined from the results of Operation S806. More specifically, in the case where the movement speed v is larger than the movement speed threshold value V, it is determined that the pointer is moving roughly, and a large thinning ratio n is applied (Operation S807). In the case where the movement speed v is smaller than the movement speed threshold value V, it is determined that the pointer is moving minutely, and a small thinning ratio m is applied (Operation S808).

Next, at Operation S809, thinning is conducted at a thinning ratio specified with respect to point information, and data after thinning is transmitted to the operated terminal 2.

The system of adjusting a point information thinning ratio in accordance with the movement speed of a pointer, which is the second thinning processing of the terminal operation apparatus of Embodiment 1, has been described.

Due to the processing of adjusting a thinning ratio in accordance with the movement speed of a pointer, in the case of moving the pointer minutely at a slow movement speed, data is transmitted for decreasing a thinning ratio of point information to move a pointer minutely on the operated terminal side. In the case of moving a pointer roughly at a high speed, a thinning ratio of point information is set to be large so as to economize the network line capacity, whereby a smooth operation of the pointer on the operated terminal side can be realized.

In the above-mentioned description, as the system of adjusting a thinning ratio of point information in accordance with the movement speed of a pointer, a system has been described, in which a sampling rate is switched between a first sampling rate and a second sampling rate. However, the present invention is not limited to switching between two sampling rates. A sampling rate may be changed in no step-by-step manner in proportion to the movement speed of a pointer. Claim 3 is also intended to switch a sampling rate between a certain value (first sampling rate) to another value (second sampling rate), and claim 3 is not intended to only switching between two fixed sampling rates.

Next, the third thinning processing of the terminal operation apparatus of Embodiment 1 will be described.

According to the third thinning processing, a thinning ratio is adjusted based on the state between an operating and an operated terminal on a network. More specifically, in the case where there are a plurality of operating terminals used by electronic conference attendants, connected to an operated terminal, a priority is assigned to each operating terminal, the amount of point information to be transmitted is adjusted by thinning processing in accordance with the priorities, and the amount of point information to be transmitted is adjusted in accordance with the condition of the operated terminal. Because of this processing, it becomes possible that a line capacity for transmission of point information is preferentially assigned to a terminal used by a conference facilitator in an electronic conference or the like using an electronic whiteboard, so as to allow the conference facilitator to preferentially move a pointer; on the other hand, point information to be transmitted from terminals of the other general attendants is thinned so as to limit the assignment of a line capacity, whereby the general attendants are allowed to move a pointer roughly.

An exemplary system of adjusting a thinning ratio in accordance with a priority of an operating terminal, which is the third thinning processing, will be described below.

There are a plurality of methods for determining precedence among the operating terminals, a priority degree, and a thinning ratio to be assigned. As examples, 5 systems: a connection precedence system of determining a thinning ratio in accordance with the order in which operating terminals are connected to the operated terminal (first prioritizing method), a CPU use ratio system of determining a thinning ratio in accordance with a CPU use ratio of the operated terminal (second prioritizing method), an operation authority owner priority system of determining a thinning ratio in such a manner that an owner of an operation authority is given priority of a pointer operation (third prioritizing method), a pointer position system of changing a thinning ratio when a pointer comes close to the vicinity of a particular region on a screen of the operated terminal (fourth prioritizing method), and a pointer use frequency system of determining a thinning ratio in accordance with a use frequency of a pointer (fifth prioritizing method) will be described below.

First, the connection order system of determining a thinning ratio in accordance with the order in which operating terminals are connected to the operated terminal will be described as the first prioritizing method.

It is assumed that there are operating terminals h1, h2, . . . , hn used by conference attendants. The operated terminal includes the first sampling rate adjusting part 60 and the priority setting part 62, as shown in FIG. 2. Variables m1, m2, . . . , mn are prepared as point information thinning ratios in the storing part 40. The priority setting part 62 includes a connection counter C representing a connection order, and a counter value is initialized to be 1. The connection counter C increments a value by "1" every time other operating terminals are connected to the operated terminal on a network. The control part 30 of the operated terminal utilizes a value Cn of the connection counter C, and calculates a point information thinning ratio mn by an equation: mn=1−1/Cn. The meaning of 1−1/Cn is to conduct thinning so that the data amount which is originally 1 becomes 1−1/Cn. The point information thinning ratio of the first connected person becomes 0, that of the second connected person becomes ½, and that of the n-th connected person becomes 1−1/n. Thus, a thinning ratio is increased as the connection becomes later.

According to the first prioritizing method using the connection order system, in a system in which a plurality of operating terminals are connected to the operated terminal, a line capacity can be preferentially assigned to a person participating in an electronic conference earlier.

Next, the CPU use ratio system of determining a thinning ratio in accordance with a CPU use ratio of the operated terminal will be described as the second prioritizing method.

It is assumed that there are operating terminals h1, h2, . . . , hn used by conference attendants. At the operated terminal, variables m1, m2, . . . , mn are prepared as point information thinning ratios in the storing part 40. The operated terminal also includes the CPU use ratio detecting part 61 as shown in FIG. 2, and includes a program for calculating a CPU use ratio U. Herein, U is a load ratio under the condition that the load at the highest use of a CPU is 1, and is in a range of $0 \leq U \leq 1$.

The CPU use ratio detecting part 61 of the operated terminal 2 calculates a point information thinning ratio mn based on the calculated CPU use ratio U by using mn=U. In this manner, as the operated terminal 2 becomes a higher load state, a thinning ratio of point information becomes larger.

According to the second prioritizing method using the CPU use ratio system, even in the case where the operated terminal 2 becomes a high load state due to the influence by a processing program, it becomes possible to decrease a delay of a remote operation from each operating terminal.

In claim 4, as a system of adjusting a point information thinning ratio in accordance with a CPU use ratio, a system of switching a sampling rate between the first sampling rate and the second sampling rate is described. However, a sampling rate may be changed in no step-by-step manner in proportion to the CPU use ratio. Claim 4 is intended to change a sampling rate from a certain value (first sampling rate) to another value (second sampling rate), and is not intended to only switching between fixed two sampling rates.

As the third prioritizing method, the operation authority owner priority system of determining a thinning ratio so that an owner of an operation authority preferentially operates a pointer will be described.

As a pointer displayed on a shared screen used by an electronic conference system, two kinds of pointers can be provided. One of them is an input·indication pointer having a function as a cursor capable of conducting an input operation. The other is an indication pointer, which is incapable of conducting an input operation, but is capable of indicating an object on a screen. The input·indication pointer is capable of conducting cursor's operations, so-called, click, drag & drop. It is required that the input indication pointer is provided with a high level of operability. On the other hand, since the indication pointer has the purpose of indicating an object on a shared screen, even when operability is degraded, there will be no serious problems unlike the input·indication pointer.

Thus, an electronic conference attendant gains an operation authority of the input·indication pointer, a point information thinning ratio is switched to be small (for example, a half of a thinning ratio of the indication pointer) in accordance with the case where a pointer to be operated is switched to the input-indication pointer, and a point information thinning ratio is switched to be large in accordance with the case where the pointer is switched to the indication pointer.

According to the third prioritizing method using the operation authority owner priority system, the operability of the input-indication pointer as a cursor on a shared screen of the operated terminal 2 is maintained at a high level, and the delay of a remote operation from each operating terminal can be decreased.

Next, as the fourth prioritizing method, the pointer position system of changing a thinning ratio when a pointer comes close to the vicinity of a particular region on a screen of the operated terminal will be described.

In operating a shared screen of the operated terminal 2, an input operation pattern by a pointer is limited to some degree. Therefore, it is possible to decrease a point information thinning ratio only with respect to particular operations to enhance the level of the operability. For example, a minute movement is required for operations of a so-called title bar, task bar, and the like, and a pointing precision therefor is required to be increased, so that a point information thinning ratio is decreased.

Exemplary processing for realizing the pointer position system will be described. First, particular regions such as a title bar, a task bar, and an event button are specified from objects displayed on a shared screen of the operated terminal 2. Coordinate information of the particular regions is stored in the storing part 40.

The control part 30 of the operated terminal 2 can always monitor the display state of the shared screen and the positional relationship of the pointer, and calculate a distance S between the particular region and the position of the pointer by using the coordinate information of the particular region such as the specified title bar. It is assumed here that, using the distance S, a point information thinning ratio mn is mn=1−1/(1+S). If the point information thinning ratio mn is determined in this manner, a thinning ratio becomes small when the pointer comes close to the particular region and the pointer can be minutely operated, and an operation of the pointer at a position far away from the particular region can be made rough.

It is preferable that when the distance S is larger than a predetermined value, the value S is prescribed at the predetermined value to set an upper limit so that a thinning ratio nm is within a reasonable range, whereby a thinning ratio is saturated when the pointer is away from the predetermined value to some degree.

Next, as the fifth prioritizing method, the pointer use frequency system of determining a thinning ratio in accordance with the use frequency of a pointer will be described.

According to this system, statistics on operation frequencies from each operating terminal h1, h2, . . . , hn to the operated terminal 2 are obtained, and a thinning ratio is determined in accordance with the operation frequencies. According to this system, a thinning ratio of an operating terminal having more chances to operate a shared screen is set to be smaller, and a thinning ratio of an operating terminal having less chances to operate the shared screen is set to be higher.

An example of processing for realizing the pointer use frequency system will be described.

The operated terminal 2 includes the operation number counter 63 as shown in FIG. 2. The operation number counter 63 records the number of transmissions of operation information from each operating terminal to the operated terminal.

The control part 30 of the operated terminal 2 monitors the transmission condition of operation information from each operating terminal connected to the operated terminal 2. The control part 30 increments a value of the corresponding operation number counter 63 every time point information is transmitted to the operated terminal from each operating terminal, and for example, counts the number of transmissions of operation information from each operating terminal to the operated terminal during a predetermined period T. Herein, for example, it is assumed that the point information thinning ratio mn is mn=1−the count number of the corresponding operating terminal/the total count number of all operating terminals. If the point information thinning ratio mn is determined in this manner, a thinning ratio of an operating terminal having more chances to operate a shared screen can be set to be smaller.

According to the prioritizing method as described above, a precedence among the operating terminals, a priority degree, and a thinning ratio to be assigned can be determined, and adjustment of a thinning ratio in accordance with the priority of an operating terminal, which is the third thinning processing, can be realized.

As described above, the terminal operation apparatus of Embodiment 1 is capable of performing the above-mentioned first thinning processing to the third thinning processing, adjusting the amount of information flowing between an operating terminal and an operated terminal, enhancing the reactivity of a pointer of the operated terminal with respect to input from a pointing device of the operating terminal, and ensuring appropriate operability.

Embodiment 2

In the terminal operation apparatus of Embodiment 2, an operation area region of an operated terminal is provided on a display screen of each operating terminal of electronic conference attendants, and an operation instruction is transmitted to the operated terminal through a network, utilizing a pointing device in the operation area. Furthermore, in the terminal operation apparatus of Embodiment 2, even in the case where such an operation area is provided, by adjusting a movement speed of an input indication pointer inside and outside of the operation area, the operated terminal can be operated in the same way as in the operating terminal without degrading the operability of the operating terminal, and the pointing device is not unintentionally positioned off the operation area during the operation of the operated terminal.

The outline of the entire structure of the terminal operation apparatus of Embodiment 2 and the outline of a processing flow in the apparatus will be described with reference to the drawings.

The structure of the terminal operation apparatus of Embodiment 2 may be the same as that shown in FIGS. 1 to 3 in Embodiment 1. The description thereof will be omitted here.

Figure 9:
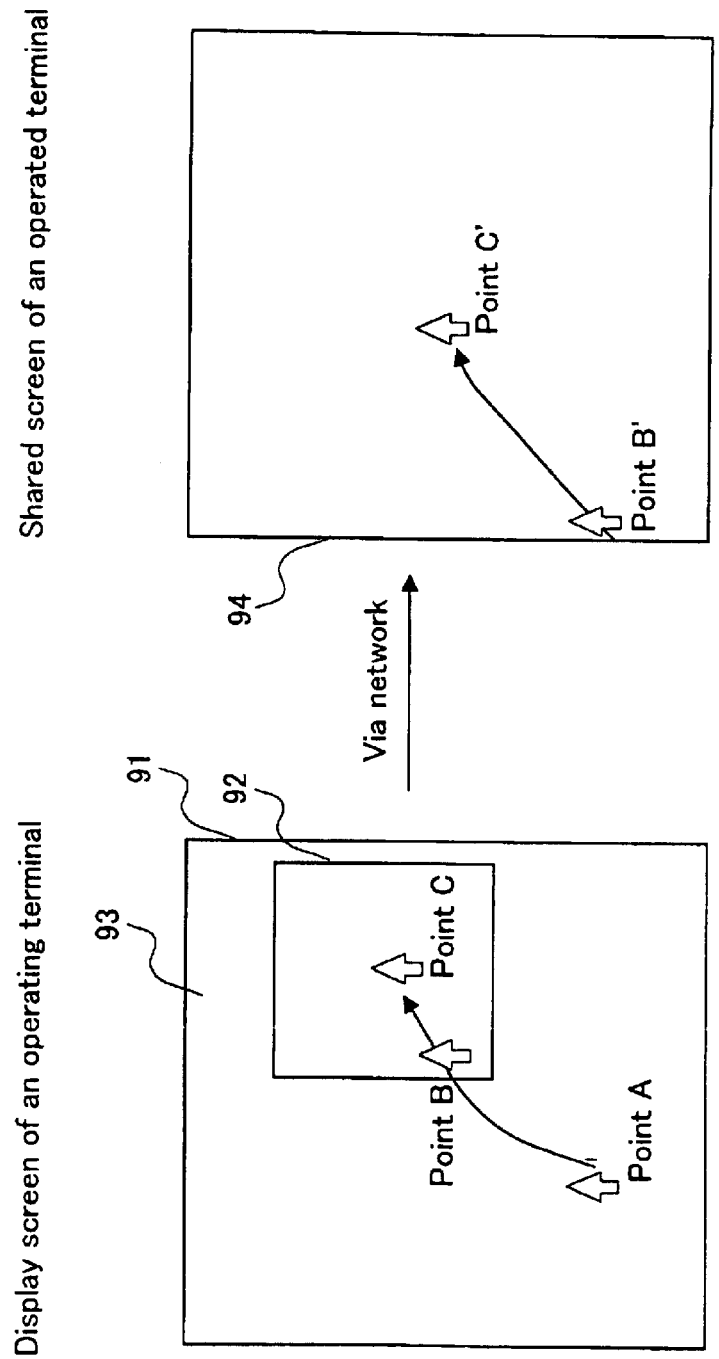
FIG. 9 shows examples of a display screen of an operating terminal and a shared screen of an operated terminal in Embodiment 2 according to the present invention.

FIG. 9 shows an exemplary display screen of an operating terminal and an exemplary shared screen of an operated terminal in Embodiment 2. As shown on the left side of FIG. 9, an operated terminal operation area 92 is provided on an operating terminal display screen 91. A portion other than the operated terminal operation area 92 is an operation area 93 of the operating terminal. In the operated terminal operation area 92, a display screen of the operated terminal 2 is displayed in a reduced size in the display screen 91 of the operating terminal 3 by the shared screen reduction displaying processing part 21. By operating a pointing device in the operated terminal operation area 92, the operated terminal can be operated in the same way as in operating the operating terminal. In this manner, a user of the operating terminal 3 can have both an operated terminal operation area and a local operation area for the operating terminal 3 in a portion of a screen of the operating terminal 3, and the entire shared screen can be displayed in a reduced size in the operated terminal operation area 92.

Based on an example of a pointer operation on a display screen of an operating terminal and an example of a pointer movement displayed on a shared screen of an operated terminal shown in FIG. 9, the relationship between the operation of the operated terminal operation area 92 and the display on the operated terminal will be described. It is assumed that a pointer is moved from a point A to a point C on the display screen 91 of the operating terminal. The movement from the point A to a point B is conducted in the operation area 93 of the operating terminal, and is not considered as an operation instruction with respect to the operated terminal 3. The movement from the point B to the point C is conducted in the operated terminal operation area 92. First, when the pointer reaches the point B, the pointer is also displayed at a point B' corresponding to the point B on a shared screen 94 of the operated terminal 3. The movement from the point B' to the point C' corresponds to the movement of the pointer in the operated terminal operation area 92. Hereinafter, this processing will be referred to as relative position display processing.

A system of realizing the above-mentioned relative position display processing will be described. According to the present invention, even in the case where the size (number of pixels in rows and columns) of the operation area is different from the size (number of pixels in rows and columns) of the display portion of the operated terminal, the pointer is displayed at relatively the same position. The point B in FIG. 9 will be exemplified. The operated terminal operation area 92 is expressed by coordinates, assuming that the upper left endpoint is an origin (0, 0), the lower right endpoint is (1, 1) that represents the maximum vertical width and the maximum horizontal width, and the point B is (1, 0.1) that is a relative position in the operated terminal operation area 92. Similarly, the shared screen 94 of the operated terminal 3 is expressed by coordinates, assuming that the upper left endpoint is an origin (0, 0) and the lower right endpoint is (1, 1) that is the maximum vertical width and the maximum horizontal width. The projection point B' on the shared screen 94 of the operated terminal 3 is displayed at the same relative position (1, 0.1) as the point B in the operated terminal operation area 92.

Regarding the movement from the point B to the point C, each point is similarly projected onto the same relative position, and the movement of the pointer in the operated terminal operation area 92 on the operating terminal 2 is expressed as the movement of the pointer in the shared screen 94 on the operated terminal 3.

Regarding the above-mentioned relative position display processing, a flow of data between the operating terminal 2 and the operated terminal 3 will be mainly described. Herein, Wj is a horizontal width (number of pixels) of the display screen of the operating terminal 2, Hj is a vertical width (number of pixels) of the display screen of the operating terminal 2, Wr is a horizontal width (number of pixels) of the display screen of the operated terminal 3, Hr is a vertical width (number of pixels) of the display screen of the operated terminal 3, Wc (Wc≦Wj) is a horizontal width (number of pixels) of the operated terminal operation area 92, Hc (Hc≦Hj) is a vertical width (number of pixels) of the operated terminal operation area 92, Xj (0≦Xj≦Wj) is a horizontal coordinate including the upper left endpoint of the display screen of the operating terminal 2 as an origin, Yj (0≦Yj≦Hj) is a vertical coordinate including the upper left endpoint of the display screen of the operating terminal 2 as an origin, Xr (0≦Xr≦Wr) is a horizontal coordinate including the upper left endpoint of the display screen of the operated terminal 3 as an origin, Yr (0≦Yr≦Hr) is a vertical coordinate including the upper left endpoint of the display screen of the operated terminal 3 as an origin, Xc (0≦Xc≦Wc) is a horizontal coordinate including the upper left endpoint of the operated terminal operation area 92, and Yc (0≦Yc≦Hc) is a vertical coordinate including the upper left endpoint of the operated terminal operation area 92 as an origin.

Figure 10:
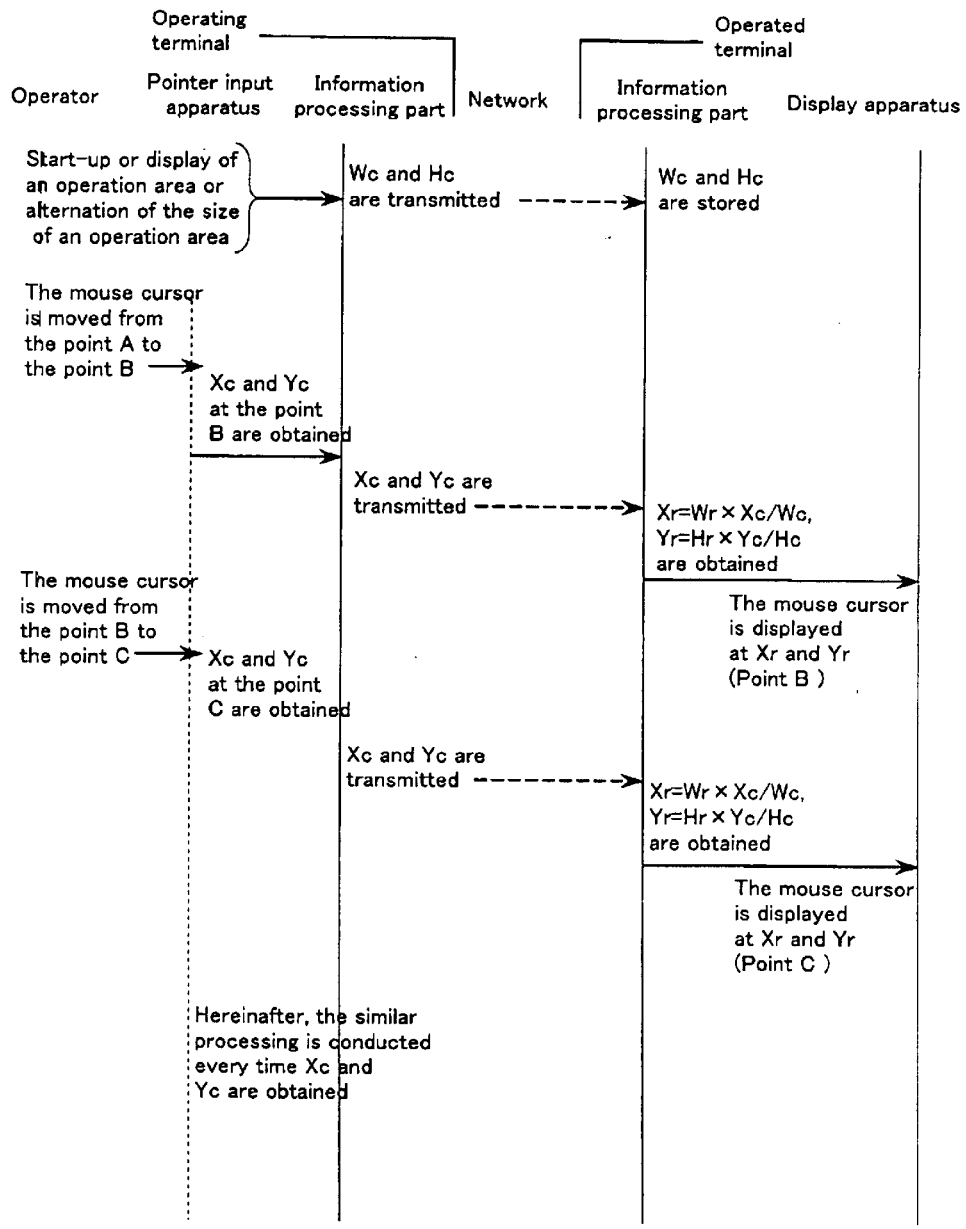
FIG. 10 is a diagram mainly illustrating a flow of data between an operating terminal and an operated terminal in Embodiment 2 according to the present invention.

As shown in FIG. 10, coordinate data is communicated between the operating terminal 2 and the operated terminal 3, whereby the shared screen 94 of the operated terminal can be operated without any abnormality by a pointer operation in the operated terminal operation area 92 on the operating terminal 2.

Next, pointer movement speed adjustment processing and pointer retreat restriction processing will be described. According to the pointer movement speed adjustment processing, the movement speed of the input indication pointer is adjusted inside and outside of the operated terminal operation area 92 on the operating terminal 2. According to the pointer retreat restriction processing, once the input-indication pointer has entered the operated terminal operation area 92, it cannot move out of the operated terminal operation area 92 unless some special operation is conducted by the input-indication pointer. The pointer movement speed adjustment processing and the pointer retreat restriction procession are particularly effective for conducting the above-mentioned relative position display processing.

First, the pointer movement speed adjustment processing will be described.

Figure 11:
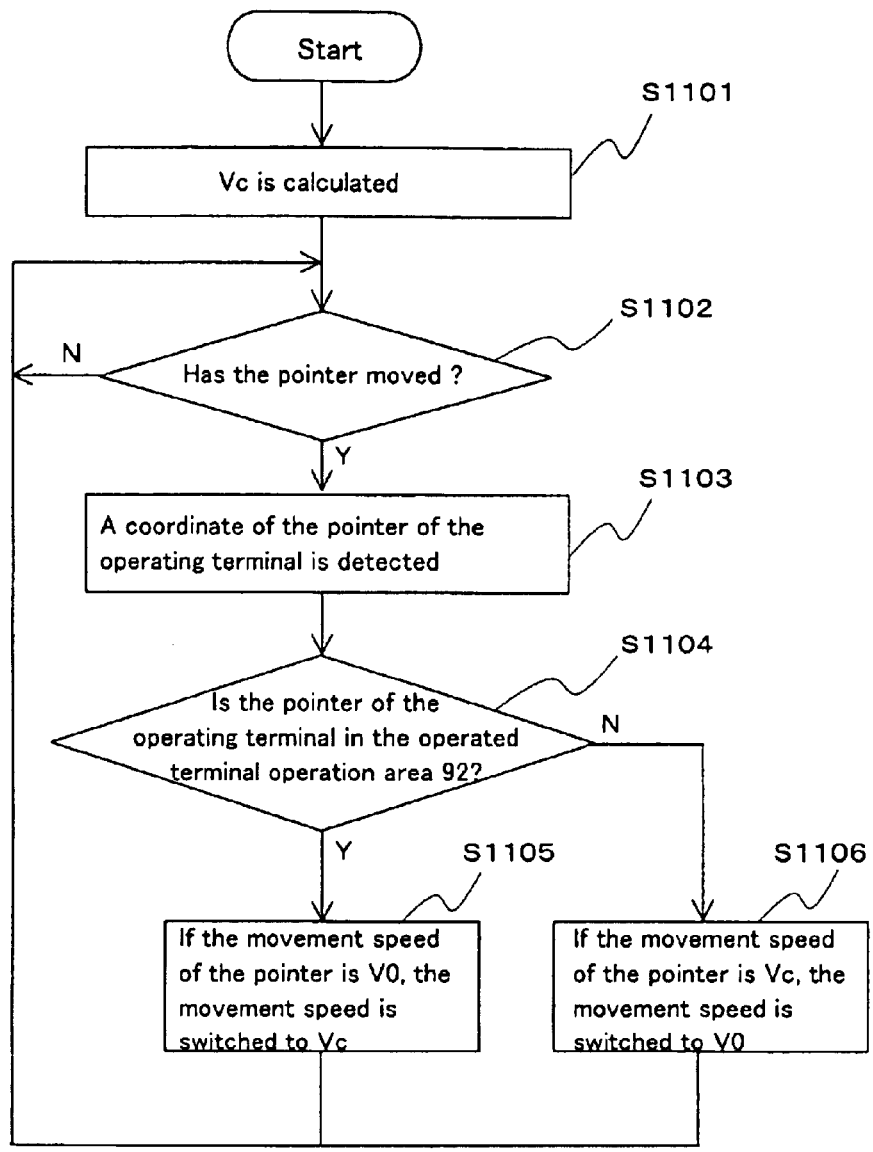
FIG. 11 is a flow chart showing processing operations of realizing a pointer movement speed adjusting system in Embodiment 2 according to the present invention.

FIG. 11 is a flow chart showing processing operations of realizing the pointer movement speed adjustment system. Herein, Vo denotes a movement speed of an input-indication pointer outside of the operated terminal operation area 92, and Vc is a movement speed of an input indication pointer in the operated terminal operation area 92. Herein, it is assumed that Vc≦Vo.

Furthermore, Vc is obtained by the following formula. In the following formula, Vox, Voy, Vcx, and Vcy represent speed components of Vo and Vc in the X-axis and Y-axis directions.

Each value: Vo, Hj, Wj, Wc, Wr, Hc, and Hr, i.e., the input-indication pointer movement speed outside of the operated terminal operation area 92, the number of pixels of the operated terminal operation area 92, and various coordinate values are respectively detected and known, so that Vc is determined by the following Formula 1

$Vox=Vo/(1+(Hj/Wj)^2)^{1/2}$ $Voy=Vo/(1+(Wj/Hj)^2)^{1/2}$ $Vcx=Vox*Wc/Wr$ $Vcy=Voy*Hc/Hr$ $Vc=(Vcx^2+Vcy^2)^{1/2}$

The control part 30 of the operating terminal 3 determines Vc based Formula 1 (Operation S1101), detects the position of the moved pointer (Operation S1102, Operation S1103), and detects whether or not the position of the input-indication pointer is in the operated terminal operation area 92 (Operation S1104). If the position of the input-indication pointer is in the operated terminal operation area 92, the control part 30 switches the movement speed of the input/indication point to Vc (Operation S1105). If the position of the input-indication pointer is outside of the operated terminal operation area 92, the control 30 switches the movement speed of the input/indication point to Vo (Operation S1106). Because of this processing, the speed of the input-indication pointer can be set to be a normal movement speed Vo at a time of setting of the operating terminal outside of the operated terminal operation area 92, and set to be relatively slow Vc in the operated terminal operation area 92. Therefore, the movement of the input indication pointer becomes gentle, and a minute movement can be expressed.

Next, the pointer retreat restriction processing will be described. Usually, an electronic conference attendant operates the shared screen 94 of the operated terminal 3 while watching it without watching the display screen 91 of the operating terminal 3 on hand. Therefore, the input-indication pointer may happen to come out of the operated terminal operation area 92. In order to avoid this, a pointer retreat restriction part is provided so as to request a special operation or a special condition for the input-indication pointer to retreat from the operated terminal operation area 92. In this manner, it is determined whether or not the retreat of the input-indication pointer from the operated terminal operation area 92 is caused by an operator's intention. Herein, a special operation or a special condition may be detectable events, which are not assigned as those, particularly for instructing other operations. Examples of special operations include the movement of a pointer under the condition of right-clicking, movement under the condition of pressing a particular key of a keyboard, and pressing of a retreat button provided in a particular portion of the operated terminal operation area 92. Furthermore, an example of a particular condition includes permission of retreat only when a pointer is moved at a predetermined or higher speed. In the case where these special operations or special conditions are not used, the input-indication pointer cannot retreat from the operated terminal operation area.

Figure 12:
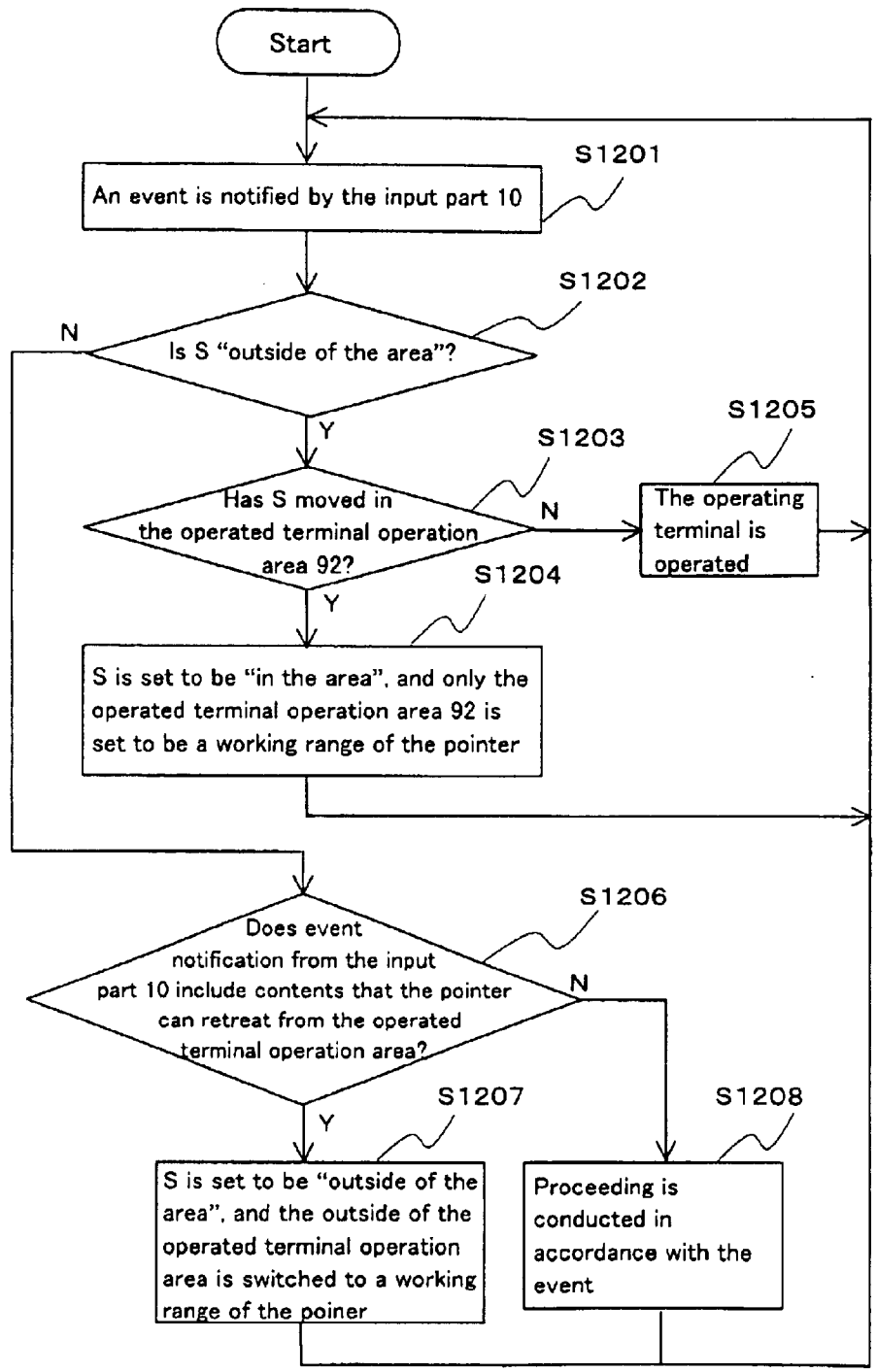
FIG. 12 is a flow chart showing processing operations of realizing a pointer retreat restriction processing in Embodiment 2 according to the present invention.

FIG. 12 is a flow chart showing processing operations of realizing the pointer retreat restriction processing.

The flow chart in FIG. 12 shows processing in the operating terminal 3. The processing on the operated terminal side is the same as that in Embodiment 1, so that the description there is omitted here.

It is assumed that, in each operating terminal 3, a status S indicating whether or not the input-indication pointer is in the operated terminal operation area 92 is prepared in a register of the storing part 40.

It is assumed that, from a waiting state, some event is inputted from the input part 10 such as the pointing device (Operation S1201). The control part 30 checks whether or not the position of the input-indication pointer is outside of the operated terminal operation area 92 at a time when the event is inputted (Operation S1202). If the input-indication pointer is outside of the operated terminal operation area 92, the process proceeds to Operation S1203. At Operation S1203, it is monitored whether or not the input-indication pointer enters the operated terminal operation area 92 by an operation. If the input-indication pointer enters the operated terminal operation area 92, the process proceeds to Operation S1204, the status S is updated to "in the area", and the movable range of the input-indication pointer is updated and registered in an operating system so that the movable range is prescribed to be the operated terminal operation area. After update processing, the process returns to Operation S1201. If the pointer is outside of the operated terminal operation area, the event is processed as an operation with respect to the operating terminal (Operation S1205).

Next, in the case where it is determined that the input-indication pointer is in the operated terminal operation area 92 at Operation 1202, the process proceeds to Operation S1206, and it is checked if operation contents satisfy a special operation and a special condition for permitting the retreat of the input-indication pointer. In the case where the retreat is not permitted, the process proceeds to Operation S1208, an operation is conducted with respect to the operated terminal 2 in accordance with the contents of the event. In the case where the retreat is permitted, the status S is updated to "outside of the area", and the movable range of the input-indication pointer is updated and registered in the operating system so that the movable range is prescribed to be the entire display screen of the operating terminal 3 (Operation S1207).

Because of the above-mentioned processing operations, the pointer retreat restriction processing can be realized.

The pointer retreat restriction processing can prevent the input indication pointer from being unintentionally positioned off the operated terminal operation area 92 during an operation of the operated terminal.

Embodiment 3

In the terminal operation apparatus of Embodiment 3, continuity is provided between the operation on a display screen of each operating terminal of an electronic conference attendant and the operation on a shared screen of an operated terminal, whereby a series of seamless processing procedures are realized. In the same way as in Embodiment 2, the operated terminal operation area 92 is provided on a display screen of an operating terminal.

The outline of the entire structure of the terminal operation apparatus and the outline of a processing flow of the apparatus in Embodiment 3 will be described with reference to the drawings.

The structure of the terminal operation apparatus of Embodiment 3 may be the same as that of Embodiment 1 shown in FIGS. 1 and 2. The description thereof will be omitted here.

Figure 13:
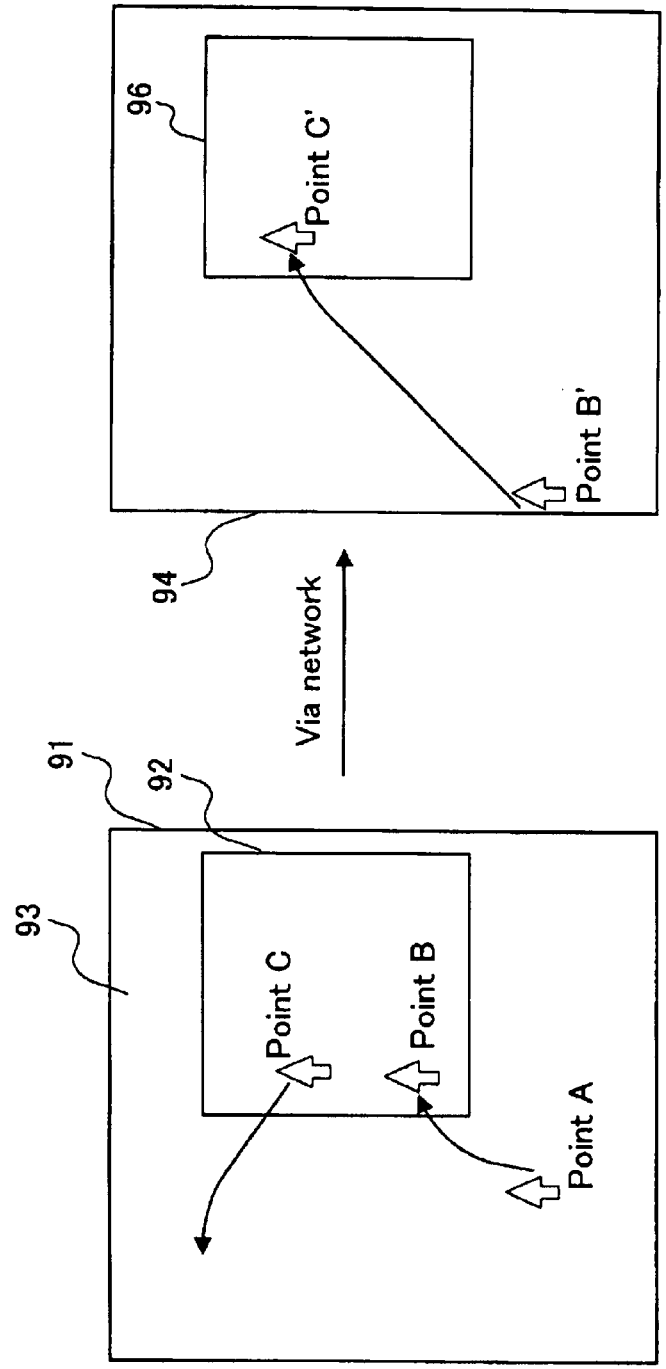
FIG. 13 is a diagram showing an exemplary display screen of a terminal operation apparatus of Embodiment 3 according to the present invention.

FIG. 13 shows an exemplary display screen of a terminal operation apparatus used by each electronic conference attendant in Embodiment 3. An inlet area 95, which is a particular region, is provided in the display screen 91 of the operating terminal 3, and an outlet area 96 is provided in the shared screen 94 of the operated terminal. Herein, the inlet area 95 is to be an element that generates a switching processing event for providing continuity from the operation of the operating terminal 2 to the operated terminal 3, and an outlet area 96 is to be an element that generates a switching processing event for providing continuity from the operation of the operated terminal 3 to the operating terminal.

An example of a synchronous operation of the operating terminal and the operated terminal utilizing the inlet area 95 and the outlet area 96 will be described. In the example shown in FIG. 13, when a pointer is moved from a point A to the inlet area 95 (e.g., a point B) on the display screen 91 of the operating terminal 3, a pointer appears at a predetermined point (e.g., a point B') on the display screen of the operated terminal 2. Thereafter, until the pointer moves to the outlet area 96, the target of input and indication from the pointing device is switched to the pointer on the shared screen 94 of the operated terminal. In the present embodiment, the pointer appears at the point B' by switching. The present invention is not limited to this example. The point B and the relative position on the screen may be the same point B", or a particular default position. Furthermore, the present invention is not limited to newly displaying the pointer on the shared screen 94 of the operated terminal by switching. It may be possible that the previous operator gives up an operation authority, and a new operator takes over the point that remains being displayed.

Herein, regarding the continuity of the operation of the pointing device, the movement in the display screen 91 of the operating terminal, the movement to the inlet area 95, and the switching to the pointer operation on the shared screen 94 of the operated terminal are continuously and seamlessly conducted, and an operator does not feel discontinuation of the operation.

Similarly, when the pointer is moved from the point B' on the shared screen 94 of the operated terminal 2 to the outlet area 96 (e.g., a point C'), a pointer appears at a predetermined point (e.g., a point C) on the display screen 91 of the operating terminal 3.

Figure 14:
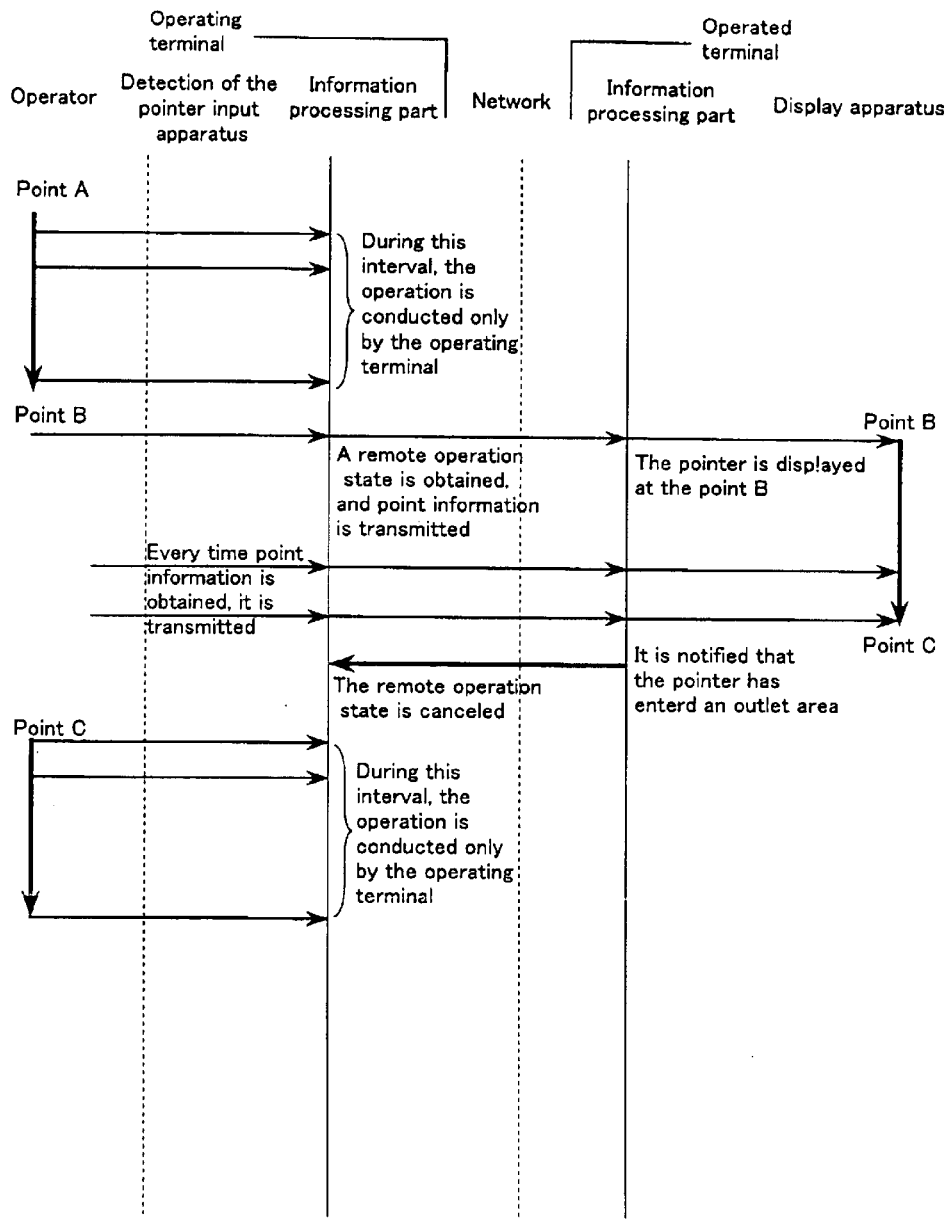
FIG. 14 is a diagram mainly illustrating a flow of data in the case of conducting a synchronous operation using an inlet area and an outlet area in Embodiment 3 according to the present invention.

FIG. 14 shows a flow of data in the case of conducting a continuous operation using the inlet area 95 and the outlet area 96. As shown in FIG. 14, when the pointer is present between the point A and the point B on the display screen 91 of the operating terminal 3, a local operation of the operating terminal is conducted, and data is not transmitted on the network. After the point B, every time point information is obtained from the pointing device, the point information is transmitted to the operated terminal 2 through the network. When the pointer enters the outlet area 96 to reach the point C' on the shared screen 94 of the operated terminal 2, transmission through the network is canceled, and a local operation of the operating terminal is conducted again.

Figure 15:
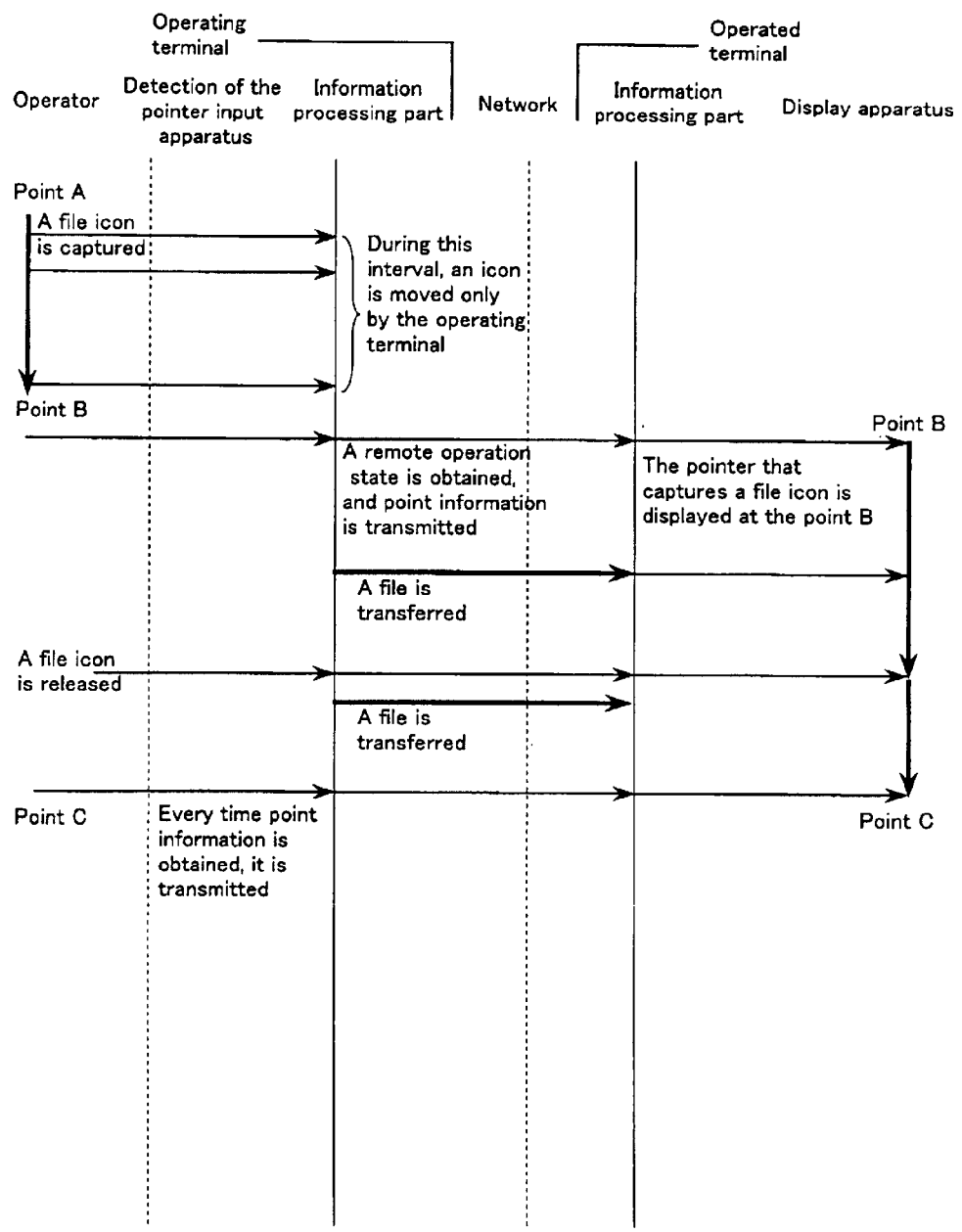
FIG. 15 is a diagram mainly illustrating a flow of data in the case of exemplifying file transfer using an inlet area and an outlet area in Embodiment 3 according to the present invention.

Furthermore, in an operating system using some graphical user interfaces that are often used in recent years, a file can be moved or copied by conducting a so-called drag & drop operation of an icon identifying a file, using a mouse cursor. In the terminal operation apparatus using the inlet area and the outlet area in Embodiment 3, for example, movement of a file between the operating terminal 3 and the operated terminal 2 can be conducted seamlessly by a series of drag & drop operations using a pointing device. More specifically, when a file stored on a desktop of the operating terminal 3 is specified and grasped by clicking on a mouse, and the file is dragged to the inlet area 95, the file is displayed at a predetermined position on the shared screen 94 of the operated terminal. Then, when an operator continues to drag the file, the file is dragged on the shared screen 94 successively. If the file is dropped at a desired position of the shared screen 94, the file is transferred from the operating terminal to the desired storage position of the operated terminal and stored therein. The file may be transferred when it is dragged to the inlet area 95. FIG. 15 shows a flow of data in the case where file transfer is exemplified.

By adjusting the relative sizes of the above-mentioned inlet area 95 and outlet area 96 on the respective display screens, the easiness of shifting from the local operation of the operating terminal 3 to the remote operation of the operated terminal 2 and the easiness of shifting from the remote operation to the local operating terminal 2 can be varied. For example, if the outlet area 96 is relatively decreased in size on the shared screen 94, the possibility of an erroneous operation that the pointer unintentionally enters the outlet area 96 on the shared screen 94 during an operation can be minimized.

Embodiment 4

In the terminal operation apparatus of Embodiment 4, while an electronic conference attendant is remotely operating an operated terminal from an operating terminal, point information inputted from a pointing device provided in the operating terminal is not given to a pointer of the operating terminal, but to only the operated terminal. Because of this, in the case where point information is given to the operating terminal during a remote operation, when an electronic conference attendant is operating a shared screen of the operated terminal while watching it, a pointer of the operating terminal on hand also moves in synchronization with the pointer on the shared screen, and a pointer is prevented from unintentionally entering a particular region such as an inlet area, as described in Embodiment 3, or an unintended event by clicking is prevented from being generated on the operating terminal.

Furthermore, in the terminal operation apparatus of Embodiment 4, an operation authority of the operated terminal can be canceled by an operation of a shared screen etc. without operating a display screen of the operating terminal.

The outline of the entire structure of the terminal operation apparatus and the outline of a processing flow of the apparatus in Embodiment 4 will be described with reference to the drawings.

Figure 16:
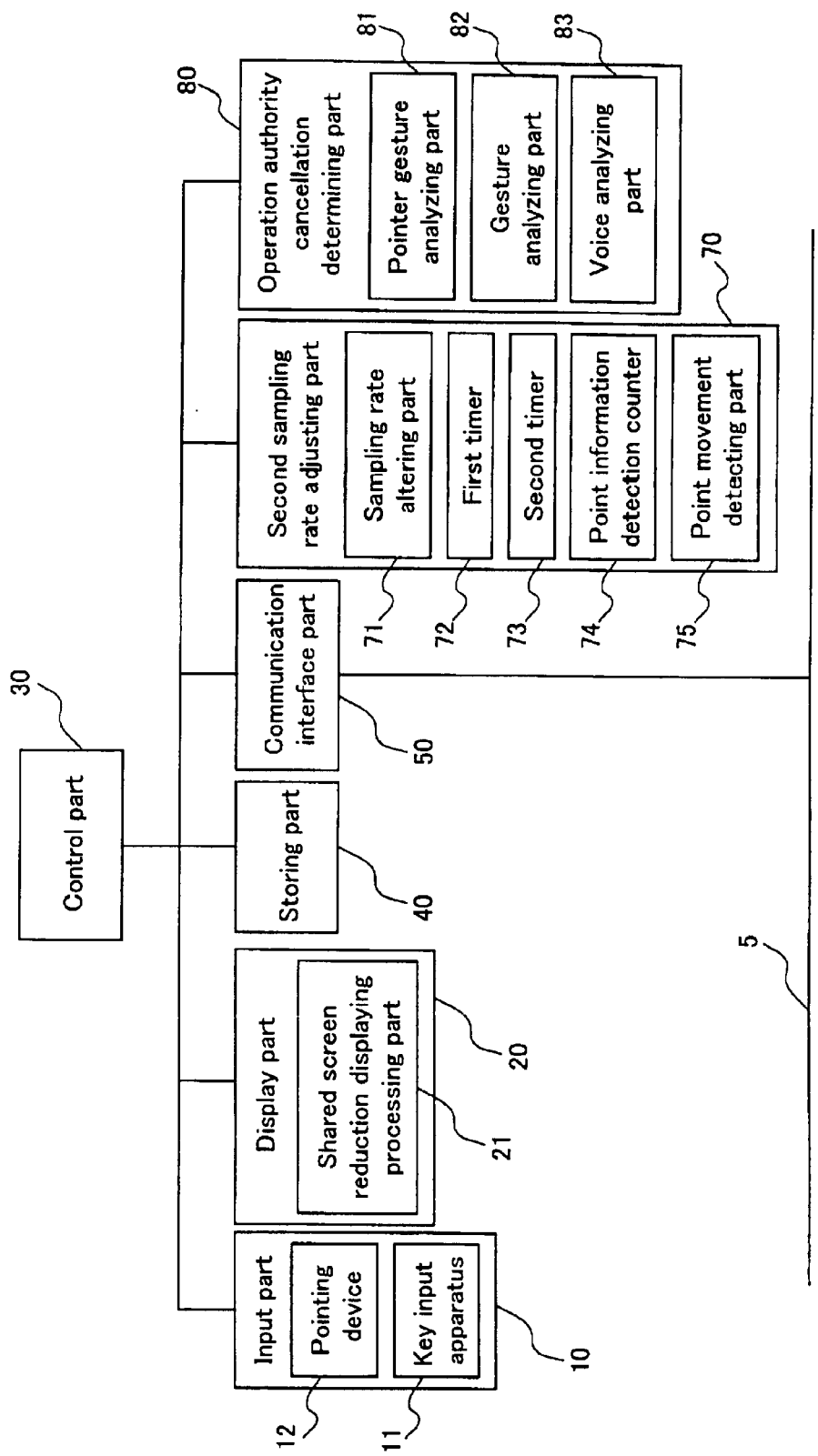
FIG. 16 is a block diagram showing a schematic structure of a terminal operation apparatus of Embodiment 4 according to the present invention.

FIG. 16 shows the structure of the terminal operation apparatus of Embodiment 4. As shown in FIG. 16, an operating terminal in Embodiment 4 is provided with an operation authority cancellation determining part 80. Elements that are the same as those in the terminal operation apparatus shown in FIGS. 1 and 2 are denoted by the same reference numerals as those therein, and the description thereof will be omitted here.

The operation authority cancellation determining part 80 includes a pointer gesture analyzing part 81, a gesture analyzing part 82, and a voice analyzing part 83. The pointer gesture analyzing part 81 analyzes and detects particular instruction contents assigned to the movement of a pointer (pointer gesture) by a pointer operation of an operator. The gesture analyzing part 82 has a camera, detects the movement of a camera-captured data of the operator, and analyzes and detects particular instruction contents assigned to the movement (gesture). The voice analyzing part 83 includes a voice input apparatus, detects voice input by the operator, and analyzes and detects particular instruction contents assigned to the voice.

The control part 30 and the operating system control a flow of point information inputted from the input part such as a pointing device, so as to selectively give the flow to either one of the operating terminal or the operated terminal. This switching is conducted by an instruction of "acquirement" and "cancellation" of an operation authority of the operated terminal of the operator.

Figure 17:
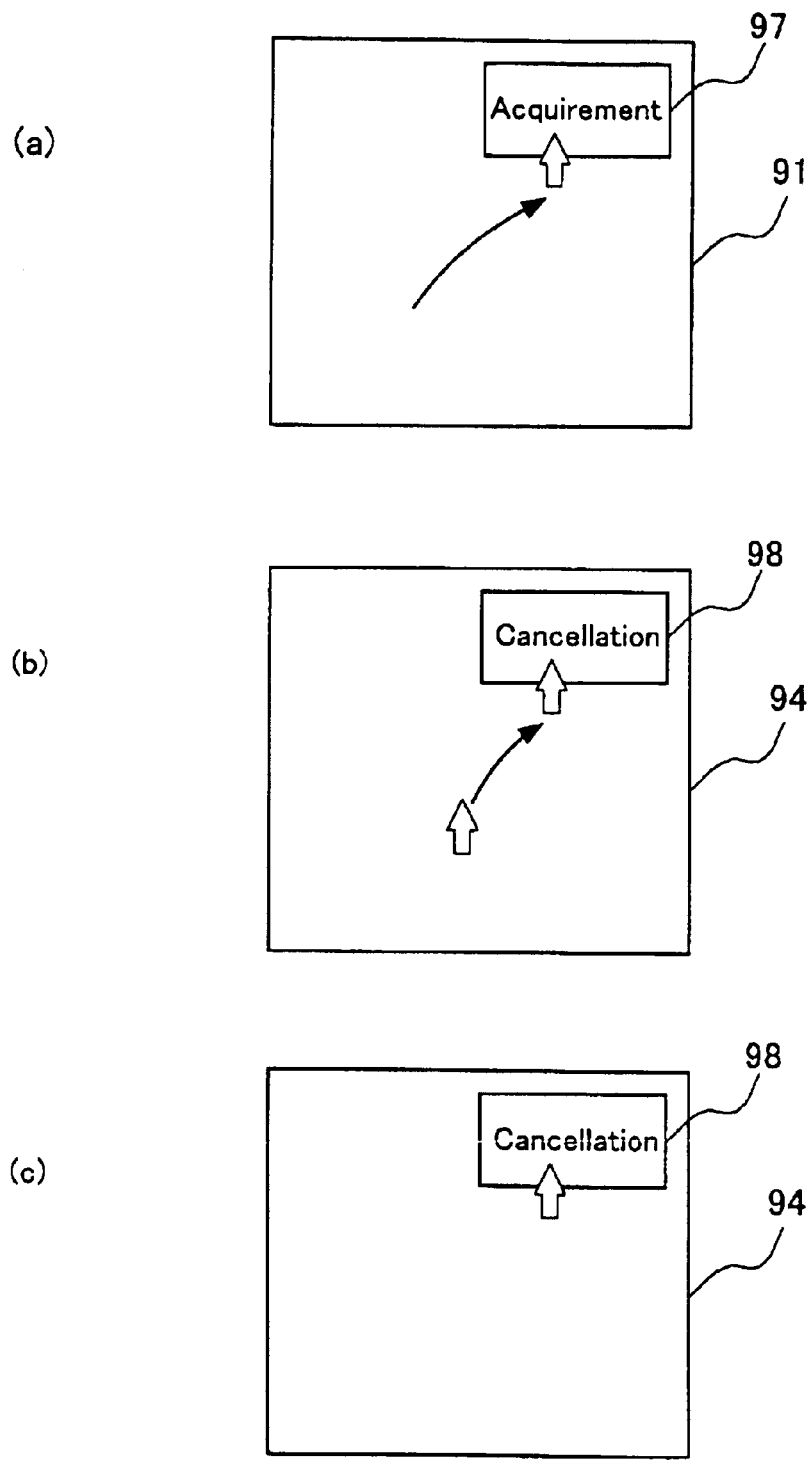
FIG. 17 shows examples of a display screen of an operating terminal and a shared screen of an operated terminal in Embodiment 4 according to the present invention.

FIG. 17 shows an exemplary display screen of the operating terminal and an exemplary shared screen of the operated terminal in Embodiment 4. FIG. 17a shows an exemplary display screen of the operating terminal, and FIGS. 17b and 17c show an exemplary shared screen of the operated terminal.

As shown in FIG. 17a, in the display screen of the operating terminal, there is provided an "acquirement" button 97 for specifying acquirement of an operation authority of the operated terminal. If an operator of the operating terminal presses the acquirement button and is admitted to an operation authority by the operated terminal, the operator acquires the operation authority of the operated terminal, a flow of point information inputted from the pointing device provided in the operating terminal is switched, the point information is given to the operated terminal through the network, and will not be taken by the operating terminal as point information. Thus, a pointer on the display screen of the operating terminal remains still in the vicinity of the acquirement button 97 on the display screen after the acquirement of the operation authority of the operated terminal.

After the acquirement of the operation authority, the operator can remotely operate the operated terminal by utilizing the pointing device, and when the operator is operating the shared screen of the operated terminal while watching it, a pointer is prevented from unintentionally entering a particular region such as an inlet area on the operating terminal, as described in Embodiment 3, or an unintended event by clicking is prevented from being generated on the operating terminal.

Next, cancellation of an acquired operation authority of an operated terminal will be described. In Embodiment 4, an operation authority can be canceled without operating an operating terminal. Regarding the cancellation method, the following five cancellation systems will be described.

According to the first system of canceling an operation authority, as shown in FIG. 17b, a "cancellation" button 98 for specifying cancellation of an operation authority of an operated terminal is provided in a shared screen of the operated terminal. If an operator of an operating terminal presses the cancellation button 98 and is admitted to cancellation of an operation authority by the operated terminal, the operator of the operating terminal can cancel the operation authority of the operated terminal, a flow of point information inputted from the pointing device provided in the operating terminal is switched, and the point information is taken only by the operating terminal without being transmitted to the operated terminal. Thus, as shown in FIG. 17c, a pointer on the shared screen of the operated terminal remains still in the vicinity of the cancellation button 98 until a next operator acquires an operation authority. On the other hand, on the operating terminal that cancels an operation authority, the operation of a pointer, which has remained still in the vicinity of the acquirement button 97 on the display screen during acquirement of the operation authority, starts again.

According to the second system of canceling an operation authority, cancellation of an operation authority is instructed and conducted based on a particular movement (gesture) of a pointer on a shared screen of an operated terminal to be operated during acquirement of an operation authority.

The operated terminal includes a gesture analyzing part 81 of a pointer, and analyzes instruction contents of gesture using the pointer by an operator. For example, pointer operations such as drawing a cross and rapid upward moving are assigned to gesture for instructing cancellation of an operation authority; upon detecting the gesture, the operated terminal cancels an operation authority.

According to the third system of canceling an operation authority, when point information is not transmitted from an operating terminal for a predetermined period of time, it is determined that a series of operations of an operated terminal by an operator are completed, and an operation authority is canceled.

The operated terminal stores a grace period until an operation authority is forcefully canceled in the second timer 73. The second timer 73 counts an elapsed time after an input operation from the pointing device of the operating terminal holding an operation authority is terminated. When a series of processings with respect to the operated terminal are completed, the operator completes an operation using the pointing device. Thereafter, the timer starts counting an elapsed time, and when the grace period has elapsed, it notifies the operated terminal of an elapse of the grace period. When detecting notification from the timer, the operated terminal cancels an operation authority. In this manner, an input operation is terminated for a predetermined period of time, based on the intention of a person having an operation authority, whereby an operation authority can be canceled.

According to the fourth system of canceling an operation authority, an operating terminal is provided with a camera, and an operation authority is canceled by human's gesture of an operator.

The operating terminal includes a camera and the gesture analyzing part 82 for analyzing human's gesture. The gesture analyzing part 82 analyzes an instruction inputted by gesture of an operator. Particular gesture, for example, gesture such as drawing a cross by a hand is registered in the gesture analyzing part as gesture for instructing cancellation of an operation authority. When completing a series of processings with respect to the operated terminal, the operator inputs gesture for instructing cancellation of an operation authority through a camera. When the gesture analyzing part identifies the gesture for instructing cancellation of an operation authority, the operating terminal transmits instruction contents to the operated terminal, and the operated terminal executes cancellation of an operation authority. Thus, a pointer operation on a display screen of the operating terminal becomes unnecessary for canceling an operation authority.

According to the fifth system of canceling an operation authority, an operating terminal is provided with a voice input apparatus, and an operation authority is canceled based on a voice input instruction by an operator.

The operating terminal includes a voice input apparatus and the voice analyzing part 83 for analyzing human's voice input. The voice analyzing part 83 analyzes a voice input instruction by the operator. For example, voice input such as "cancellation" is registered in the voice analyzing part 83 as an instruction for canceling an operation authority. When completing a series of processings of the operated terminal, the operator inputs an instruction for canceling an operation authority from the voice input apparatus. When the voice analyzing part 83 identifies an instruction for canceling an operation authority, the operating terminal transmits instruction contents to the operated terminal, and the operated terminal executes cancellation of an operation authority. Thus, a pointer operation on a display screen of the operating terminal becomes unnecessary for canceling an operation authority.

As described above, for canceling an operation authority, a minute operation by a pointer on a display screen of an operating terminal can be made unnecessary, and after obtaining an operation authority, a series of operations until an operation authority is canceled can be conducted mainly on a shared screen, which makes it possible to conduct a smooth operation.

Embodiment 5

Figure 18:
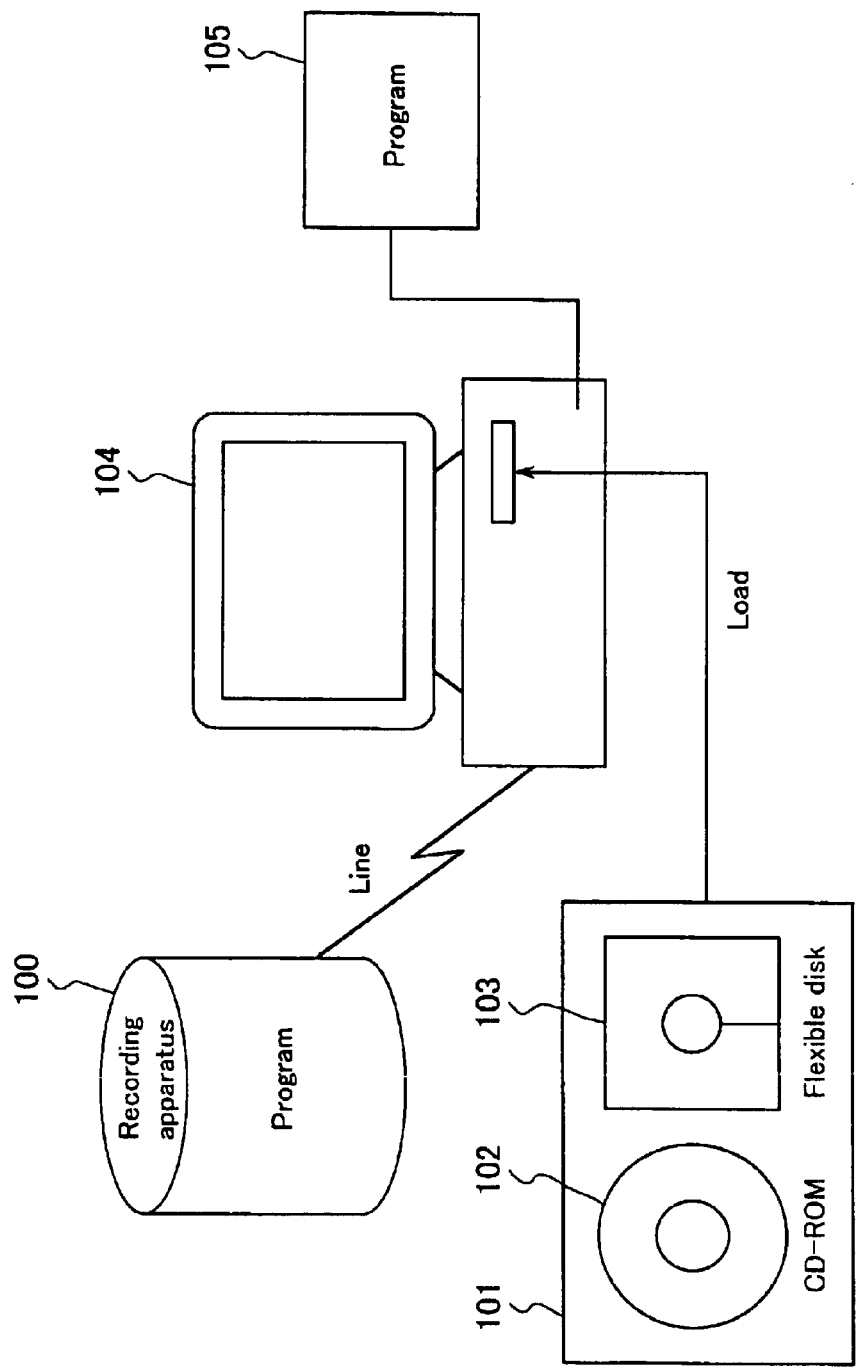
FIG. 18 shows examples of recording media of Embodiment 5 according to the present invention.

The terminal operation apparatus of the present invention can be constructed using various kinds of computers by storing a program describing processing operations of realizing the above-mentioned structure in a computer-readable recording medium. Examples of a recording medium storing a program including processing operations of realizing the terminal operation apparatus of the present invention include a recording medium 100 in a recording apparatus on a network and a recording medium 105 such as a hard disk and a RAM of a computer, as well as a portable recording medium 101 such as a CD-ROM 102 and a flexible disk 103, as shown in FIG. 18. In execution, the program is loaded onto a computer 104, and executed on a main memory.

It should be understood that, regarding the terminal operation apparatus of the present invention, various modifications and alterations can be made with respect to the above-mentioned method and apparatus without departing from the idea of the invention. Thus, it should be noted that the present invention is not limited to the above-mentioned embodiments.

INDUSTRIAL APPLICABILITY

In the terminal operation apparatus of the present invention, the amount of information flowing between an operating terminal and an operated terminal, and the response of a pointer of the operated terminal to input from a pointing device of the operating terminal can be enhanced.

Furthermore, in the terminal operation apparatus of the present invention, the relationship in a pointer display position between an operation area and a shared screen is adjusted, whereby an abnormal feeling of an operation is eliminated. Furthermore, even in the case where an operation area is provided, a minute operation is made possible without degrading the operability of a single operating terminal due to pointer movement speed adjustment processing, and an environment is provided in which the operated terminal can be operated in the same way as in the operating terminal. Furthermore, due to the pointer movement restriction processing, a pointer will not be unintentionally positioned off the operation area on a display screen of the operating terminal during an operation of the operated terminal.

Furthermore, in the terminal operation apparatus of the present invention, an inlet area is provided on a display screen of the operating terminal and an outset area is provided on a shared screen of the operated terminal, whereby transition of an operation from the operating terminal to the operated terminal is made continuous, and continuity can be provided to a series of operations.

Furthermore, in the terminal operation apparatus of the present invention, during a remote operation of the operated terminal, point information can be given to only the operated terminal without being given to a pointer of the operating terminal, and a pointer can be prevented from unintentionally entering a particular region on the operating terminal and/or an unintended event is prevented from being generated on the operating terminal by clicking.

What is claimed is:

1. A terminal operation apparatus comprising at least one operating terminal and at least one operated terminal connected through a network, the operated terminal being remotely operated by the operating terminal, wherein:
wherein the operating terminal includes an input part provided with a pointing device and a sampling rate adjusting part for altering a sampling rate of point information inputted from the input part, and an amount of the point information transmitted to the network is adjusted by adjusting a sampling rate of the point information from the input part; and the operating terminal includes a first timer for storing a first set time and a second timer for storing a second set time, the first timer counts an elapsed time from commencement of input of point information from the input part, the second timer counts an elapsed time from termination of input of point information from the Input part, the sampling rate adjusting part adjusts the sampling rate as a first sampling rate within the first set time and adjusts the sampling rate as a second sampling rate after an elapse of the first set time, and the first timer is reset by an elapse of the second set time.

2. A terminal operation apparatus comprising at least one operating terminal and at least one operated terminal connected through a network, the operated terminal being remotely operated by the operating terminal, wherein:
the operating terminal includes an input part provided with a pointing device and a sampling rate adjusting part for altering a sampling rate of point information inputted from the input part, and an amount of the point information transmitted to the network is adjusted by adjusting a sampling rate of the point information from the input part; and the operating terminal includes a pointer movement speed detecting part for detecting a movement speed of a pointer from point information inputted from the input part, the sampling rate adjusting part adjusts the sampling rate as a first sampling rate if the detected pointer movement speed is equal to or lower than a set speed and adjusts the sampling rate as a second sampling rate if the pointer movement speed is higher than the set speed.

3. A terminal operation apparatus comprising at least one operating terminal and at least one operated terminal connected through a network, the operated terminal being remotely operated by the operating terminal, wherein:
the operating terminal includes an input part provided with a pointing device and a sampling rate adjusting part for altering a sampling rate of point information inputted from the input part, and an amount of the point information transmitted to the network is adjusted by adjusting a sampling rate of the point information from the input part; and the operated terminal includes a CPU use ratio detecting part for detecting a CPU use ratio, the sampling rate adjusting part adjusts the sampling rate as a first sampling rate if the detected CPU use ratio is equal to or smaller than a predetermined level and adjusts the sampling rate as a second sampling rate if the detected CPU use ratio is larger than the predetermined level.

4. A terminal operation apparatus comprising at least one operating terminal and at least one operated terminal connected through a network, the operated terminal being remotely operated by the operating terminal, wherein:
the operating terminal includes an input part provided with a pointing device and a sampling rate adjusting part for altering a sampling rate of point information inputted from the input part, and an amount of the point information transmitted to the network is adjusted by adjusting a sampling rate of the point information from the input part; and the operated terminal includes a display part displaying a shared screen and sets a particular region on the shared screen of the display part, and the sampling rate adjusting part of the operating terminal alters and adjusts a sampling rate in accordance with a distance between a pointer displayed on the shared screen and the particular region.

5. A terminal operation apparatus comprising at least one operating terminal and at least one operated terminal connected through a network, the operated terminal being remotely operated by the operating terminal, wherein:

the operating terminal includes an input part provided with a pointing device and a sampling rate adjusting part for altering a sampling rate of point information inputted from the input part, and an amount of the point information transmitted to the network is adjusted by adjusting a sampling rate of the point information from the input part; and the operated terminal includes a priority setting part for setting priorities among the operating terminals, and the sampling rate adjusting part of the operating terminal alters a sampling rate of point information in accordance with the set priority.

6. A terminal operation apparatus according to claim 5, wherein the priority setting part sets priorities among the operating terminals in accordance with an order of connection to the operated terminal.

7. A terminal operation apparatus according to claim 5, wherein the operated terminal includes an operation authority setting part for setting an operation authority for preferentially conducting an operation of the operated terminal with respect to the operating terminal, and the priority setting part sets higher priority with respect to a person holding an operation authority given by the operation authority setting part.

8. A terminal operation apparatus comprising at least one operating terminal and at least one operated terminal connected through a network, the operated terminal being remotely operated by the operating terminal, wherein the operated terminal includes a display part to be a shared screen, the operating terminal includes an input part provided with a pointing device and a display part provided with a shared screen reduction displaying processing part for displaying an operated terminal operation area in which the shared screen of the operated terminal is displayed in a reduced size, in a case where a pointer of the pointing device is outside of the operated terminal operation area, operation information by the pointing device is taken in as operation information with respect to the operating terminal, in a case where the pointer of the pointing device is in the operated terminal operation area, operation information by the pointing device is transmitted to the operated terminal to remotely operate the operated terminal, and a relative position of the pointer in the operated terminal operation area is equal to a relative position of a pointer on the shared screen of the operated terminal.

9. A terminal operation apparatus according to claim 8, wherein, with respect to a movement operation of the pointer by the pointing device of the operating terminal, a movement speed of the pointer on the display screen of the operating terminal is altered depending upon whether or not the pointer is in the operated terminal operation area.

10. A terminal operation apparatus according to claim 8, wherein the operating terminal includes a pointer retreat restriction part for restricting retreat of the pointer from the operated terminal operation area, and in a case of detecting a previously set event, the pointer retreat restriction part permits retreat of the pointer from the operated terminal operation area.

11. A terminal operation apparatus, comprising:

at least one operating terminal and at least one operated terminal connected through a network, the operated terminal being remotely operated by the operating terminal, wherein the operating terminal includes an input part provided with a pointing device and a display part provided with an operated terminal inlet area, the operated terminal includes a display part to be a shared screen, the shared screen includes an operated terminal outlet area, the inlet area and the outlet area are particular regions for generating an event for switching an operation target of the pointing device, in a case where a pointer enters the inlet area on the display screen of the operating terminal, operation information by the pointing device is transmitted to the operated terminal to execute a remote operation of a pointer on the shared screen of the operated terminal, in a case where the pointer enters the outlet area on the shared screen of the operated terminal, the remote operation of the operated terminal is canceled, and operation information by the pointing device is taken in as operation information with respect to the operating terminal.

12. A terminal operation apparatus according to claim 11, wherein the operating terminal and the operated terminal manage a file by relating it to a particular file identifier, when the file identifier is moved to the inlet area on the display screen of the operating terminal, the file is transmitted to the operated terminal, and a file identifier corresponding to the file is displayed on the shared screen of the operated terminal.

13. A terminal operation apparatus according to claim 11, wherein a ratio of the inlet area occupying the display screen of the operating terminal and a ratio of the outlet area occupying the shared screen of the operated terminal can be adjusted.

14. A terminal operation apparatus, comprising:

at least one operating terminal and at least one operated terminal connected through a network, the operated terminal being remotely operated by the operating terminal, wherein:

the operating terminal includes an input part provided with a pointing device, the operated terminal includes a display part to be a shared screen and an operation authority setting part for setting an operation authority for preferentially conducting an operation of the operated terminal with respect to the operating terminal, and cancellation of the set operation authority can be conducted by a particular operation of a pointer on the shared screen of the operated terminal; and the shared screen of the operated terminal includes an operation authority cancellation button region, and the operation authority is canceled by a pressing operation of the operation authority cancellation button region by the pointer on the shared screen.

15. A terminal operation apparatus comprising at least one operating terminal and at least one operated terminal connected through a network, the operated terminal being remotely operated by the operating terminal, wherein:

the operating terminal includes an input part provided with a pointing device, the operated terminal includes a display part to be a shared screen and an operation authority setting part for setting an operation authority for preferentially conducting an operation of the operated terminal with respect to the operating terminal, and cancellation of the set operation authority can be conducted by a particular operation of a pointer on the shared screen of the operated terminal; and the operated terminal includes a pointer gesture analyzing part for analyzing operation gesture based on a movement of the pointing device, and the gesture analyzing part analyzes gesture for instructing cancellation of an operation authority by an operation of the pointer on the shared screen of an operator, thereby canceling the operation authority.

16. A terminal operation apparatus comprising at least one operating terminal and at least one operated terminal connected through a network, the operated terminal being remotely operated by the operating terminal, wherein:

the operating terminal includes an input part provided with a pointing device, the operated terminal includes a display part to be a shared screen and an operation authority setting part for setting an operation authority for preferentially conducting an operation of the operated terminal with respect to the operating terminal, and cancellation of the set operation authority can be conducted by a particular operation of a pointer on the shared screen of the operated terminal; and the operated terminal includes a timer for storing a grace period until an operation authority is forcefully canceled, the timer counts an elapsed time after an input operation from the pointing device of the operating terminal holding an operation authority is terminated, and cancels the operation authority if the grace period has elapsed.

17. A terminal operation apparatus, comprising:

at least one operating terminal and at least one operated terminal connected through a network, the operated terminal being remotely operated by the operating terminal, wherein:

the operating terminal includes an input part provided with a pointing device, the operated terminal includes a display part to be a shared screen and an operation authority setting part for setting an operation authority for preferentially conducting an operation of the operated terminal with respect to the operating terminal, and cancellation of the set operation authority can be conducted by a particular operation of a pointer on the shared screen of the operated terminal; and the operating terminal includes a voice input apparatus and a voice analyzing part for analyzing human's voice input, input for instructing cancellation by operator's voice from the voice input apparatus is analyzed by the voice analyzing part, and the operation authority can be canceled by notifying the operated terminal of cancellation of the operation authority.

18. A computer-readable recording medium storing a processing program for realizing a terminal operation apparatus that comprises at least one operating terminal and at least one operated terminal connected through a network, the operated terminal being remotely operated by the operating terminal, the program including: a point information input processing operation of receiving input of point information at the operating terminal; a processing operation of providing a display screen having an operated terminal operation area as a display screen of the operating terminal; a processing operation of providing a shared screen of the operated terminal; a processing operation of, in a case where a pointer based on the input point information is outside of the operated terminal operation area, using the point information as operation information with respect to the operating terminal; a processing operation of, in a case where the pointer based on the Input point information is in the operated terminal operation area, transmitting the point information to the operated terminal to remotely operate the operated terminal; and a processing operation of displaying in such a manner that a relative position of the pointer in the operated terminal operation area is equal to a relative position of the pointer in the shared screen of the operated terminal.

19. A computer-readable recording medium storing a processing program for realizing a terminal operation apparatus that comprises at least one operating terminal and at least one operated terminal connected through a network, the operated terminal being remotely operated by the operating terminal, the program including: a point information input processing operation of receiving input of point information at the operating terminal; a processing operation of providing a display screen having an operated terminal inlet area as a display screen of the operating terminal; a processing operation of providing a shared screen of the operated terminal having an operated terminal outlet area; a processing operation of, in a case where a pointer enters the inlet area on the display screen of the operating terminal, transmitting operation information by the pointing device to the operated terminal to execute a remote operation of a pointer on the shared screen of the operated terminal; and a processing operation of, in a case where the pointer enters the outlet area on the shared screen of the operated terminal, canceling the remote operation of the operated terminal and taking in the operation information by the pointing device as operation information with respect to the operating terminal.

20. A computer-readable recording medium storing a processing program for allowing an operating terminal connected to an operated terminal through a network to remotely operate the operated terminal, the operating terminal including an input part provided with a pointing device for receiving input of point information, a first timer for storing a first set time, and a second timer for storing a second set time, the first timer counting an elapsed time from commencement of input of point information from the input part and being reset by an elapse of the second set time, and the second timer counting an elapsed time from termination of input of point information from the input part, and the processing program comprising execution instructions of:

a point information input processing operation of receiving input of point information from the input part of the operating terminal; and a sampling rate alteration processing operation of altering a sampling rate of the input point information, wherein, in the sampling rate alteration processing operation, the sampling rate is set to be a first sampling rate within the first set time and the sampling rate is set to be a second sampling rate after an elapse of the first set time, whereby an information amount of the point information to be sent to the network is adjusted.

21. A computer-readable recording medium storing a processing program for allowing an operating terminal connected to an operated terminal through a network to remotely operate the operated terminal, the operating terminal including an input part, the processing program comprising execution instructions of:

a point information input processing operation of receiving input of point information from the input part of the operating terminal;

a pointer movement speed detecting operation of detecting a movement speed of a pointer from point information inputted from the input part; and a sampling rate alteration processing operation of altering a sampling rate of the input point information, wherein, in the sampling rate alteration processing operation, the sampling rate is set to be a first sampling rate if the pointer movement speed detected by the pointer movement speed detecting operation is equal to or lower than a set speed, and the sampling rate is set to be a second sampling rate if the pointer movement speed is higher than the set speed, whereby an information amount of the point information to be sent to the network is adjusted.

22. A computer-readable recording medium storing a processing program for allowing an operating terminal connected to an operated terminal through a network to remotely operate the operated terminal, the operating terminal including an input part, the processing program comprising execution instructions of:

a point information input processing operation of receiving input of point information from the input part of the operating terminal;

a CPU use ratio detecting operation of detecting a CPU use ratio of the operated terminal; and a sampling rate alteration processing operation of altering a sampling rate of the input point information, wherein, in the sampling rate alteration processing operation, the sampling rate is set to be a first sampling rate if the CPU use ratio detected by the CPU use ratio detecting operation is equal to or smaller than a predetermined level, and the sampling rate is set to be a second sampling rate if the detected CPU use ratio is larger than the predetermined level, whereby an information amount of the point information to be sent to the network is adjusted.

23. A computer-readable recording medium storing a processing program for allowing an operating terminal connected to an operated terminal through a network to remotely operate the operated terminal, the operating terminal including an input part, the operated terminal including a display part displaying a shared screen and setting a particular region on the shared screen of the display part, and the processing program comprising execution instructions of:

a point information input processing operation of receiving input of point information from the input part of the operating terminal; and a sampling rate alteration processing operation of altering a sampling rate of the input point information, wherein, in the sampling rate alteration processing operation, a sampling rate is altered and adjusted in accordance with a distance between a pointer displayed on the shared screen and the particular region, whereby an information amount of the point information to be sent to the network is adjusted.

24. A computer-readable recording medium storing a processing program for allowing an operating terminal connected to an operated terminal through a network to remotely operate the operated terminal, the operating terminal including an input part, the operated terminal including a priority setting part for setting priorities among the operating terminals, and the processing program comprising execution instructions of:

a point information input processing operation of receiving input of point information from the input part of the operating terminal; and a sampling rate alteration processing operation of altering a sampling rate of the input point information, wherein, in the sampling rate alteration processing operation, a sampling rate of point information is altered in accordance with the priority set by the priority setting part, whereby an information amount of the point information to be sent to the network is adjusted.

25. The computer-readable recording medium according to claim 24, wherein the priority setting part sets priorities among the operating terminals in accordance with an order of connection to the operated terminal.

26. The computer-readable recording medium according to claim 24, wherein the operated terminal includes an operation authority setting part for setting an operation authority for preferentially conducting an operation of the operated terminal with respect to the operating terminal, and the priority setting part sets higher priority with respect to a person holding an operation authority given by the operation authority setting part.

27. A computer-readable recording medium storing a processing program for realizing a terminal operation apparatus that includes at least one operating terminal and at least one operated terminal connected through a network and allows the operating terminal to remotely operate the operated terminal, the processing program comprising execution instructions of:

a point information input processing operation of receiving input of point information at the operating terminal;

a screen providing processing operation of providing a shared screen of the operated terminal;

an operation authority setting processing operation of setting an operation authority for preferentially conducting an operation of the operated terminal with respect to the operating terminal; and an operation authority cancellation processing operation of canceling the set operation authority in a case where a pressing operation is performed by the pointer with respect to an operation authority cancellation button region provided on the shared screen of the operated terminal.

28. A computer-readable recording medium storing a processing program for realizing a terminal operation apparatus that includes at least one operating terminal and at least one operated terminal connected through a network and allows the operating terminal to remotely operate the operated terminal, the processing program comprising execution instructions of:

a point information input processing operation of receiving input of point information at the operating terminal;

a screen providing processing operation of providing a shared screen of the operated terminal;

an operation authority setting processing operation of setting an operation authority for preferentially conducting an operation of the operated terminal with respect to the operating terminal; and an operation authority cancellation processing operation of canceling the set operation authority in a case where it is determined that there is gesture for instructing cancellation of an operation authority by an operation of the pointer on the shared screen.

29. A computer-readable recording medium storing a processing program for realizing a terminal operation apparatus that includes at least one operating terminal and at least one operated terminal connected through a network and allows the operating terminal to remotely operate the operated terminal, the operated terminal including a timer for storing a grace period until an operation authority is force fully canceled, and the processing program comprising execution instructions of:

a point information input processing operation of receiving input of point information at the operating terminal;

a screen providing processing operation of providing a shared screen of the operated terminal;

an operation authority setting processing operation of setting an operation authority for preferentially conducting an operation of the operated terminal with respect to the operating terminal; and an operation authority cancellation processing operation of canceling the set operation authority in a case where an elapsed time after an input operation from the pointing device of the operating terminal holding an operation authority is terminated exceeds the grace period.

30. A computer-readable recording medium storing a processing program for realizing a terminal operation apparatus that includes at least one operating terminal and at least one operated terminal connected through a network and allows the operating terminal to remotely operate the operated terminal, the operating terminal including a voice input apparatus and a voice analyzing part for analyzing humans voice input, and the processing program comprising execution instructions of:

a point information input processing operation of receiving input of point information at the operating terminal;

a screen providing processing operation of providing a shared screen of the operated terminal;

an operation authority setting processing operation of setting an operation authority for preferentially conducting an operation of the operated terminal with respect to the operating terminal; and an operation authority cancellation processing operation of canceling the set operation authority in a case where it is determined by the voice analyzing part that an input voice from the voice input apparatus is an input voice from the voice input apparatus is an instruction for canceling the set operation authority.

* * * * *

UNITED STATES PATENT AND TRADEMARK OFFICE
CERTIFICATE OF CORRECTION

PATENT NO. : 6,889,365 B2
DATED : May 3, 2005
INVENTOR(S) : Tohru Okahara et al.

It is certified that error appears in the above-identified patent and that said Letters Patent is hereby corrected as shown below:

Column 30,
Line 6, change "Input" to -- input --;
Lines 42 and 60, after "and" insert a paragraph return;

Column 33,
Line 63, change "Input" to -- input --.

Signed and Sealed this

Twenty-seventh Day of December, 2005

JON W. DUDAS
*Director of the United States Patent and Trademark Office*